(12) United States Patent
Martinez et al.

(10) Patent No.: US 8,356,109 B2
(45) Date of Patent: Jan. 15, 2013

(54) NETWORK STREAMING OF A VIDEO STREAM OVER MULTIPLE COMMUNICATION CHANNELS

(75) Inventors: Martin Martinez, Ladera Ranch, CA (US); Eric Riggert, Lake Forest, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/779,905

(22) Filed: May 13, 2010

(65) Prior Publication Data

US 2011/0283009 A1 Nov. 17, 2011

(51) Int. Cl.
*G06F 15/16* (2006.01)

(52) U.S. Cl. .......................................... 709/231
(58) Field of Classification Search ................... 709/231, 709/232
See application file for complete search history.

(56) References Cited

U.S. PATENT DOCUMENTS

| | | | |
|---|---|---|---|
| 5,544,161 A | 8/1996 | Bigham et al. |
| 5,583,859 A | 12/1996 | Feldmeier |
| 5,640,605 A | 6/1997 | Johnson et al. |
| 5,642,155 A | 6/1997 | Cheng |
| 5,666,514 A | 9/1997 | Cheriton |
| 5,812,708 A | 9/1998 | Rao |
| 5,841,771 A | 11/1998 | Irwin et al. |
| 5,862,136 A | 1/1999 | Irwin |
| 5,864,677 A | 1/1999 | Van Loo |
| 5,889,903 A | 3/1999 | Rao |
| 5,893,155 A | 4/1999 | Cheriton |
| 5,905,502 A | 5/1999 | Deering |
| 5,956,332 A | 9/1999 | Rasanen et al. |
| 6,006,106 A | 12/1999 | Cook et al. |
| 6,064,192 A | 5/2000 | Redmyer |
| 6,064,672 A | 5/2000 | Van Loo et al. |
| 6,065,052 A | 5/2000 | Van Loo |
| 6,233,615 B1 | 5/2001 | Van Loo |
| 6,247,060 B1 | 6/2001 | Boucher et al. |
| 6,295,598 B1 | 9/2001 | Bertoni et al. |
| 6,334,153 B2 | 12/2001 | Boucher et al. |
| 6,393,487 B2 | 5/2002 | Boucher et al. |
| 6,434,620 B1 | 8/2002 | Boucher et al. |
| 6,463,472 B1 | 10/2002 | Van Loo |
| 6,477,169 B1 | 11/2002 | Angle et al. |

(Continued)

OTHER PUBLICATIONS

Newmarch, J., Introduction to Stream Control Transmission Protocol, Sep. 1, 2007, available at www.linuxjournal.com/article/9748.

(Continued)

*Primary Examiner* — Larry Donaghue
(74) *Attorney, Agent, or Firm* — Fitzpatrick, Cella, Harper & Scinto

(57) ABSTRACT

The present disclosure is directed to streaming a video from a sending endpoint to a receiving endpoint. Both of the sending endpoint and the receiving endpoint have multiple communication channels connecting the sending endpoint and the receiving endpoint to one or more networks, respectively, and the streaming video includes a plurality of intra-frame coded frames and a plurality of inter-frame coded frames. The sending endpoint sends different ones of the plurality of intra-frame coded frames and different ones of high priority inter-frame coded frames to the receiving endpoint over more than one of the multiple communication channels having a connection-oriented protocol. In addition, the sending endpoint sends different ones of non-high priority inter-frame coded frames to the receiving endpoint over more than one of the multiple communication channels having a connectionless-oriented protocol.

27 Claims, 17 Drawing Sheets

U.S. PATENT DOCUMENTS

| | | | |
|---|---|---|---|
| 6,512,610 B1 | 1/2003 | Minami et al. | |
| 6,543,053 B1 | 4/2003 | Li et al. | |
| 6,564,262 B1 | 5/2003 | Chaddha | |
| 6,597,665 B1 | 7/2003 | Van Loo et al. | |
| 6,665,283 B2 | 12/2003 | Harris et al. | |
| 6,674,477 B1 * | 1/2004 | Yamaguchi et al. | 348/387.1 |
| 6,728,775 B1 | 4/2004 | Chaddha | |
| 6,744,986 B1 | 6/2004 | Vohra | |
| 6,751,665 B2 | 6/2004 | Philbrick et al. | |
| 6,788,679 B1 | 9/2004 | Yi | |
| 6,792,470 B2 * | 9/2004 | Hakenberg et al. | 709/232 |
| 6,879,590 B2 | 4/2005 | Pedersen et al. | |
| 6,895,185 B1 | 5/2005 | Chung et al. | |
| 6,959,300 B1 | 10/2005 | Caldwell et al. | |
| 6,975,647 B2 | 12/2005 | Neale et al. | |
| 7,047,309 B2 | 5/2006 | Baumann et al. | |
| 7,062,171 B2 | 6/2006 | Ota et al. | |
| 7,069,235 B1 | 6/2006 | Postelnik et al. | |
| 7,133,922 B1 | 11/2006 | She et al. | |
| 7,136,394 B2 | 11/2006 | Horowitz et al. | |
| 7,159,036 B2 | 1/2007 | Hinchliffe et al. | |
| 7,167,926 B1 | 1/2007 | Boucher et al. | |
| 7,174,393 B2 | 2/2007 | Boucher et al. | |
| 7,191,241 B2 | 3/2007 | Boucher et al. | |
| 7,215,679 B2 | 5/2007 | Pugel | |
| 7,230,921 B2 | 6/2007 | Eriksson et al. | |
| 7,237,036 B2 | 6/2007 | Boucher et al. | |
| 7,240,358 B2 | 7/2007 | Horn et al. | |
| 7,242,686 B1 | 7/2007 | Dougherty et al. | |
| 7,254,344 B2 | 8/2007 | Kim et al. | |
| 7,260,826 B2 | 8/2007 | Zhang et al. | |
| 7,269,171 B2 | 9/2007 | Poon et al. | |
| 7,284,070 B2 | 10/2007 | Boucher et al. | |
| 7,286,502 B1 | 10/2007 | Rao et al. | |
| 7,289,509 B2 | 10/2007 | Brown et al. | |
| 7,310,310 B1 | 12/2007 | Shenoi et al. | |
| 7,310,316 B2 | 12/2007 | Auerbach | |
| 7,337,241 B2 | 2/2008 | Boucher et al. | |
| 7,346,701 B2 | 3/2008 | Elzur et al. | |
| 7,372,820 B1 | 5/2008 | Cheung et al. | |
| 7,505,590 B1 * | 3/2009 | Apostolopoulos | 380/210 |
| 2004/0016000 A1 | 1/2004 | Zhang et al. | |
| 2004/0062198 A1 | 4/2004 | Pedersen et al. | |
| 2006/0028991 A1 | 2/2006 | Tan et al. | |
| 2006/0062242 A1 | 3/2006 | Dacosta | |
| 2007/0110035 A1 | 5/2007 | Bennett | |
| 2007/0248115 A1 | 10/2007 | Miller et al. | |
| 2009/0219937 A1 * | 9/2009 | Liu et al. | 370/392 |

OTHER PUBLICATIONS

Stream Control Transmission Protocol, While Papers, International Engineering Consortium, 2007, available at www.iec.org/online/tutorials/sctp/.

Stewart, et al., Stream Control Transmission Protocol, Standards Track, Oct. 2000, pp. 1 to 134, available at www.ietf.org/rfc/rfc2960.txt.

Siddhartha Devadhar, et al., MPEG Background, brmc Berkeley, available at http://bmrc.berkeley.edu/research/mpeg/mpeg_overview.html (last visited Sep. 15, 2009).

Gene Cheung, et al., Packet Scheduling of Streaming Video With Flexible Reference Frame Using Dynamic Programming and Integer Rounding, Hewlett-Packard Laboratories, 2006.

Gaurav Khanna, et al, Multi-Hop Path Splitting and Multi-Pathing Optimizations for Data Transfers over Shared Wide-Area Networks Using GridFTP, Technical Report, OSU-CISRC-1/08-TR03, pp. 1 to 17, 2008.

U.S. Appl. No. 12/463,367, filed May 8, 2009.

* cited by examiner

NETWORK STREAMING OF A VIDEO STREAM OVER MULTIPLE COMMUNICATION CHANNELS

BACKGROUND

1. Field

The present disclosure generally relates to video streaming, and more specifically relates to network video streaming from a sending endpoint to a receiving endpoint.

2. Description of the Related Art

In the field of video streaming, video streams may be sent from a sending side to a receiver side using a connectionless-oriented protocol, for example, a User Datagram Protocol (UDP). When using a connectionless-oriented protocol, there is no guarantee that all of the data of the video stream will be delivered to the receiver side, and there is no validation of the content of the data received at the receiver side. Therefore, there is a possibility that data may be lost when sent using a connectionless-oriented protocol. When specifically streaming video using a connectionless-oriented protocol, important reference frames may be lost which may significantly affect the quality of the streaming video.

SUMMARY

One solution to this problem is to send a video stream by using a connection-oriented protocol, such as Transmission Control Protocol (TCP). However, when sending a video stream using a connection-oriented protocol, delivery is guaranteed using a system of timeouts and retries, which makes the protocol more complex to process. The more complex processing with using a connection-oriented protocol may cause great delay in data delivery, which may lead to network congestion and degrade the quality of the video stream. Thus, using a connection-oriented protocol to stream a video stream may not always be viable.

In the present disclosure, the foregoing problems are addressed by streaming a video stream from a sending endpoint to a receiving endpoint, wherein both of the sending endpoint and the receiving endpoint have multiple communication channels connecting the sending endpoint and the receiving endpoint to one or more networks, respectively. The streamed video includes a plurality of intra-frame coded frames (such as I-frames) and a plurality of inter-frame coded frames (such as a plurality of P-frames and a plurality of B-frames). When streaming the video stream, different ones of the plurality of intra-frame coded frames, and different ones of the plurality of inter-frame coded frames which are determined as high priority frames, are sent over more than one of the multiple communication channels having a connection-oriented protocol. In addition, different ones of the plurality of inter-frame coded frames which are determined not to be high priority frames are sent over more than one of the multiple communication channels having a connectionless-oriented protocol.

Thus, in an example embodiment described herein, the sending endpoint sends different ones of the plurality of intra-frame coded frames over more than one of the multiple communication channels having a connection-oriented protocol, such as a Transmission Control Protocol (TCP). In this example embodiment, the multiple communication channels are carried over multiple physical interfaces connecting the sending endpoint and the receiving endpoint to multiple networks, respectively. In another example embodiment, the multiple communication channels are carried over a single physical interface. In addition, a determination is made as to whether an inter-frame coded frame is or is not a high priority frame. In this regard, an inter-frame coded frame is a high priority frame if a number of references to the inter-frame coded frame by other inter-frame coded frames is more than a threshold number. Different ones of the plurality of inter-frame coded frames which are determined to be high priority frames are sent over more than one of the multiple communication channels having a connection-oriented protocol. Moreover, different ones of the plurality of inter-frame coded frames which are determined not to be high priority frames are sent over more than one of the multiple communication channels having a connectionless-oriented protocol, such as a User Datagram Protocol (UDP). The sent intra-frame coded frames and inter-frame coded frames are then received at the receiving endpoint, and recombined to reconstruct the video stream.

By virtue of the foregoing arrangement, it is ordinarily possible to ensure delivery of important reference frames (i.e., intra-frame coded frames and high priority inter-frame coded frames) of a streaming video, while reducing delay of the streaming video and congestion within a network, which in turn reduces any possible degradation of the quality of the video stream. More specifically, because different ones of the intra-frame coded frames and different ones of the high priority inter-frame coded frames of the streaming video are sent over more than one of multiple communication channels having a connection-oriented protocol, the intra-frame coded frames and the high priority inter-frame coded frames are more likely to be successfully delivered than if the intra-frame coded frames and the high priority inter-frame coded frames were sent over a connectionless-oriented protocol. Also, the intra-frame coded frames are delivered more quickly and with less delay since the intra-frame coded frames are sent over multiple communication channels. Furthermore, because different ones of less important frames (i.e., inter-frame coded frames which are not high priority frames) are sent over more than one of multiple communication channels having a connectionless-oriented protocol, any possible delay in streaming the video may be reduced because less data is sent using a connection-oriented protocol.

According to another example embodiment described herein, the sending endpoint advances transmission of frame for transmission out of sequence, based on expectations for arrival time, so as to result in "just in time" arrival at the receiving endpoint. A determination is made as to an expected difference in arrival time between intra-frame coded frames and/or high priority inter-frame coded frames sent concurrently over different ones of the multiple communication channels having a connection-oriented protocol. In addition, a determination is made as to an expected difference in arrival time between non-high priority inter-frame coded frames sent concurrently over different ones of the multiple communication channels having a connectionless-oriented protocol. In a case that the streaming video has not been streaming for enough time to determine the expected difference in arrival times, each determination may be made using historical statistical data regarding performances of each of the communication channels.

In the step of sending the intra-frame coded frames or high priority inter-frame coded frames, a next available intra-frame coded frame or a next available high priority inter-frame coded frame is sent over a fastest one of the multiple communication channels having a connection-oriented protocol. The fastest one of the multiple communication channels is determined based on the determined expected difference in arrival time. An intra-frame coded frame or a high priority inter-frame coded frame is extracted from further back in the plurality of intra-frame coded frames or plurality of inter-frame coded frames in accordance with the determined expected difference in arrival time. Then, the extracted intra-frame coded frame or high priority inter-frame coded frame is sent on a corresponding slower one of the multiple communication channels. The next available intra-frame coded frame or high priority inter-frame coded frame is then sent from the sending endpoint nearly simultaneously as the extracted intra-frame coded frame or high priority inter-frame coded frame is sent from the sending endpoint.

In the step of sending the non-high priority inter-frame coded frames, a next non-high priority inter-frame coded frame of the plurality of inter-frame coded frames is sent over a fastest one of the multiple communication channels having a connectionless-oriented protocol. The fastest one of the multiple communication channels is determined based on the determined expected difference in arrival time. A non-high priority inter-frame coded frame is extracted from further back in the plurality of inter-frame coded frames in accordance with the determined expected difference in arrival time. Then, the extracted non-high priority inter-frame coded frame is sent on a corresponding slower one of the multiple communication channels. The next available non-high priority inter-frame coded frame is then sent from the sending endpoint nearly simultaneously as the extracted non-high priority inter-frame coded frame is sent from the sending endpoint.

By virtue of the foregoing arrangement, it is ordinarily possible to ensure that intra-frame coded frame and inter-frame coded frames of the video stream are received at the receiving endpoint on time and in approximate order, which in turn minimizes any unnecessary processing requirements at the receiving endpoint. As a result, any possible delays in playback of the video stream due to an overload of a buffer at the receiving endpoint can be reduced.

According to yet another example embodiment described herein, each of the intra-frame coded frames and the high priority inter-frame coded frames are split into a series of data packets, and each of the non-high priority inter-frame coded frames are split into a series of data packets. Then, when sending the frames over the multiple communication channels, different ones of the series of data packets are sent over the multiple communication channels.

In yet another example embodiment described herein, a determination is made as to an expected difference in arrival time between data packets of the intra-frame coded frames and/or high priority inter-frame coded frames sent concurrently over different ones of the multiple communication channels having a connection-oriented protocol. In addition, a determination is made as to an expected difference in arrival time between data packets of the non-high priority inter-frame coded frames sent concurrently over different ones of the multiple communication channels having a connectionless-oriented protocol.

In the step of sending data packets of the intra-frame coded frames or high priority inter-frame coded frames, a next available data packet of the series of data packets of the intra-frame coded frames or high priority inter-frame coded frames is sent over a fastest one of the multiple communication channels having a connection-oriented protocol. The fastest one of the multiple communication channels is determined based on the determined expected difference in arrival time. A data packet of the series of data packets of the intra-frame coded frames or the high priority inter-frame coded frames is extracted from further back in the series of data packets in accordance with the determined expected difference in arrival time, and the extracted data packet is sent on a corresponding slower one of the multiple communication channels. Then, the next available data packet of the series of data packets of the intra-frame coded frames or the high priority inter-frame coded frames is sent from the sending endpoint nearly simultaneously as the extracted data packet is sent from the sending endpoint.

In the step of sending data packets of the non-high priority inter-frame coded frames, a next available data packet of the series of data packets of the non-high priority inter-frame coded frames is sent over a fastest one of the multiple communication channels having a connectionless-oriented protocol. The fastest one of the multiple communication channels is determined based on the determined expected difference in arrival time. A data packet of the series of data packets of the non-high priority inter-frame coded frames is extracted from further back in the series of data packets in accordance with the determined expected difference in arrival time, and the extracted data packet is sent on a corresponding slower one of the multiple communication channels. Then, the next available data packet is sent from the sending endpoint nearly simultaneously as the extracted data packet is sent from the sending endpoint.

According to an additional example embodiment described herein, the multiple communication channels having a connection-oriented protocol comprised of a first bondable virtual interface. Moreover, the multiple communication channels having a connectionless-oriented protocol comprised of a second bondable virtual interface. In this example embodiment, a determination is made as to an expected difference in arrival time for data sent concurrently over the first bondable virtual interface and the second bondable virtual interface. An amount of preloaded data including intra-frame coded frames and inter-frame coded frames is then sent over a fastest one of the first bondable virtual interface and the second bondable virtual interface, the fastest one being determined based on the determined expected difference in arrival time.

In a case that the first bondable virtual interface is the fastest, a next available intra-frame coded frame or high priority inter-frame coded frame is sent over the first bondable virtual interface. In addition, a non-high priority inter-frame coded frame is extracted from further back in the video stream and sent over the second bondable virtual interface. The extracted non-high priority inter-frame coded frame is sent nearly simultaneously as the next available intra-frame coded frame or high priority inter-frame coded frame. Subsequently, the sending of the intra-frame coded frames and high priority inter-frame coded frames out of order over the multiple communication channels having a connection-oriented protocol, as described above, is performed. Moreover, the sending of the non-high priority inter-frame coded frames out of order over the multiple communication channels having a connectionless-oriented protocol, as described above, is performed. Alternatively, the intra-frame coded frames and the high priority inter-frame coded frames can subsequently be split into data packets, and the data packets can be sent out of order over the communication channels having a connection-oriented protocol as described above. Moreover, the non-high priority inter-frame coded frames can then be split into data packets, and the data packets can be sent out of order over the communication channels having a connectionless-oriented protocol as described above.

In a case that the second bondable virtual interface is the fastest, a next available non-high priority inter-frame coded frame is sent over the second bondable virtual interface. In addition, an intra-frame coded frame or high priority inter-frame coded frame is extracted from further back in the video stream and sent over the first bondable virtual interface. The extracted intra-frame coded frame or high priority inter-frame coded frame is sent nearly simultaneously as the next available non-high priority inter-frame coded frame. Subsequently, the sending of the intra-frame coded frames and high priority inter-frame coded frames out of order over the multiple communication channels having a connection-oriented protocol, as described above, is performed. Moreover, the sending of the non-high priority inter-frame coded frames out of order over the multiple communication channels having a connectionless-oriented protocol, as described above, is performed. Alternatively, the intra-frame coded frames and the high priority inter-frame coded frames can subsequently be split into data packets, and the data packets can be sent out of order over the communication channels having a connection-oriented protocol as described above. Moreover, the non-high priority inter-frame coded frames can then be split into data packets, and the data packets can be sent out of order over the communication channels having a connectionless-oriented protocol as described above.

In an example embodiment also described herein, an amount of preloaded data including both intra-frame coded frames and inter-frame coded frames is sent over one of the multiple communication channels having a connection-oriented protocol. This amount of preloaded data is sent before the video stream is split into the plurality of intra-frame coded frames and the plurality of inter-frame coded frames. The amount of preloaded data is determined based upon a size of a buffer included in the receiving endpoint and a playback rate of the video stream at the receiving endpoint. Since an amount of preloaded data is sent before splitting and sending the frames over different communication channels, enough time can be allowed to pass so that accurate determinations can be made with respect to the expected difference in arrival times between the different communication channels.

In an additional example embodiment described herein, the threshold number is set by a user. Alternatively, the threshold number is determined based upon a number of frames that are dropped before a quality of service (QoS) is reduced such that the reduction in QoS is noticeable to a viewer.

According to an additional example embodiment described herein, in a case that an inter-frame coded frame is not received by the receiving endpoint, feedback is sent from the receiving endpoint to the sending endpoint indicating the inter-frame coded frame that was not received. The inter-frame coded frame is then re-sent over one of the multiple communication channels having a connection-oriented protocol.

This brief summary has been provided so that the nature of the disclosure may be understood quickly. A more complete understanding can be obtained by reference to the following detailed description and to the attached drawings.

DETAILED DESCRIPTION

Figure 1:
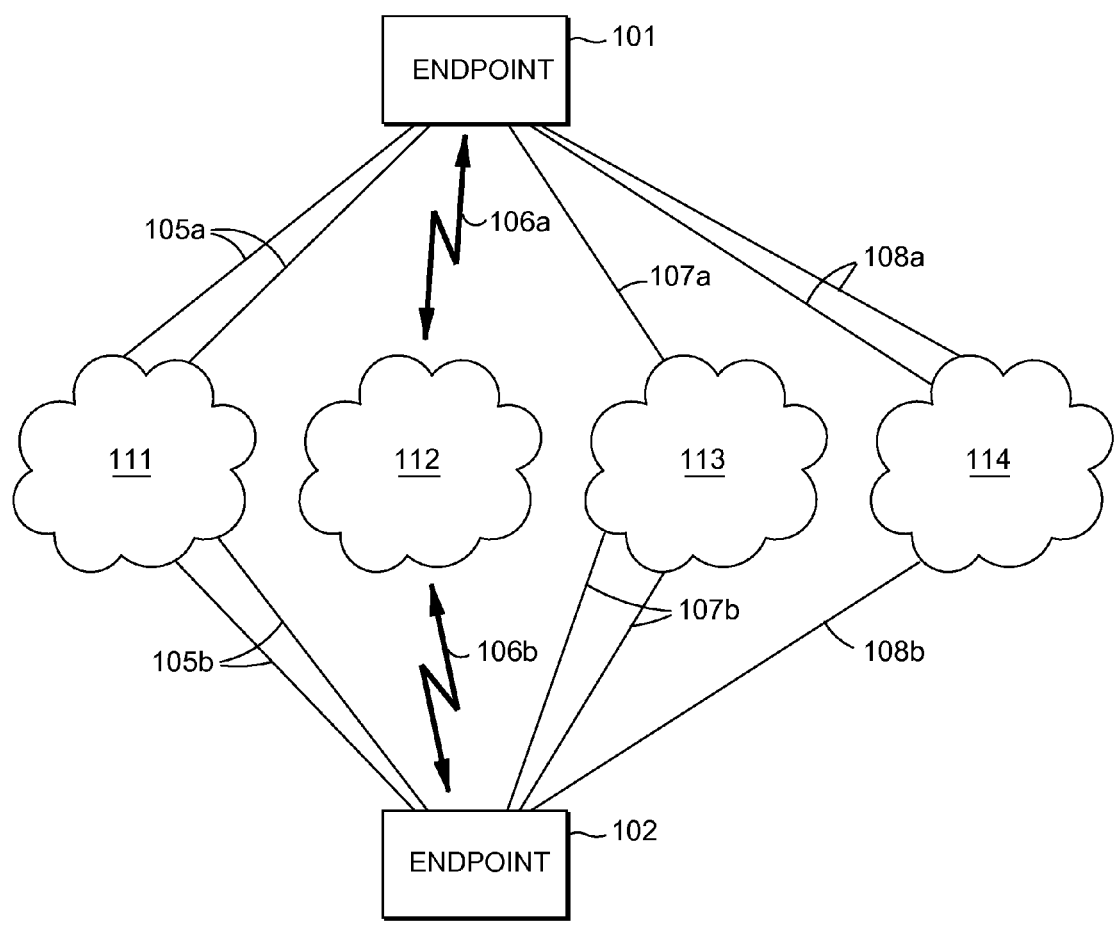
FIG. 1 is a representative view of a sending endpoint and a receiving endpoint, connected via multiple communication channels, on which an example embodiment may be implemented.

FIG. 1 is a representative view of a sending endpoint and a receiving endpoint, connected via multiple communication channels, on which an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple communication channels, including at least one or more communication channel for each different network. As shown in the example of FIG. 1, sending endpoint 101 includes communication channels 105*a*, 106*a*, 107*a* and 108*a*. More specifically, sending endpoint 101 has communication channels 105*a* which connect sending endpoint 101 to network 111. In FIG. 1, sending endpoint 101 is shown to have two communication channels 105*a* connecting to network 111; however, in other embodiments, sending endpoint 101 may have a single communication channel connecting to network 111, or may have more than two communication channels connecting to network 111.

Receiving endpoint 102 also has multiple communication channels 105*b* connecting to network 111. Similar to sending endpoint 101, receiving endpoint 102 may also have a single or multiple communication channels connecting to network 111. As a result of the communication channel connections, sending endpoint 101 is connected to receiving endpoint 102 through network 111, using communication channels 105*b*.

Similar to the above-described connection between sending endpoint 101 and receiving endpoint 102, sending endpoint 101 and receiving endpoint 102 are connected through networks 112, 113 and 114 via communication channels 106*a* and 106*b*, 107*a* and 107*b* and 108*a* and 108*b*. Accordingly, sending endpoint 101 is connected to network 112 through one or more communication channels 106*a*; and, receiving endpoint 102 is connected to network 112 through one or more communication channels 106*b*. Sending endpoint 101 is connected to network 113 through one or more communication channels 107a; and, receiving endpoint 102 is connected to network 113 through one or more communication channels 107b. Lastly, sending endpoint 101 is connected to network 114 through one or more communication channels 108a; and, receiving endpoint 102 is connected to network 114 through one or more communication channels 108b. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Each of the communication channels can have either a connection-oriented protocol or a connectionless-oriented protocol. In this regard, a communication channel having a connection-oriented protocol is a communication channel which delivers a stream of data after first establishing a communication session. Examples of a connection-oriented protocol which may be used in this example embodiment include, but not limited to, Transmission Control Protocol (TCP), Datagram Congestion Control Protocol (DCCP), connection-oriented Ethernet, and Asynchronous Transfer Mode (ATM).

A communication channel having a connectionless-oriented protocol is a communication channel which transmits data from one endpoint to another endpoint, without first ensuring that the recipient is available and ready to receive the data. Examples of a connectionless-oriented protocol which may be used in this example embodiment include, but not limited to, User Datagram Protocol (UDP), Internet Control Message Protocol (ICMP) and Real Time Streaming Protocol (RTSP).

In the example embodiment shown in FIG. 1, the multiple communication channels are carried over multiple physical interfaces connecting the sending endpoint 101 and the receiving endpoint 102 to multiple networks 111 to 114, respectively. However, in another example embodiment, the multiple communication channels are carried over a single physical interface, which will be described in more detail below in connection with FIG. 2.

Networks 111, 112, 113 and 114, as shown in FIG. 1, can be many different types of networks, such as, for example, an Ethernet network, a Multimedia over Coax Alliance (MoCA) network, a HomePNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, such as a media server. A media server is an endpoint that will transfer audio and video data (or other types of large data) to a client. The media server may also be a modified third party application accessing the sending endpoint 101. For example, the media server can be a media center PC or a commercial web server that hosts media for a large web site. In this example embodiment, the media server can stream many different types of video, such as, for example, MPEG-1, MPEG-2, MPEG-3, MPEG-4 and AVI. In this regard, the streaming video is compressed video consisting of intra-frame coded frames and inter-frame coded frames.

The receiving endpoint 102 serves as an application receiver, such as a media client or media player. A media client or media player is an endpoint that receives data from a media server, and is used primarily for video and audio stream playing.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint.

Figure 2:
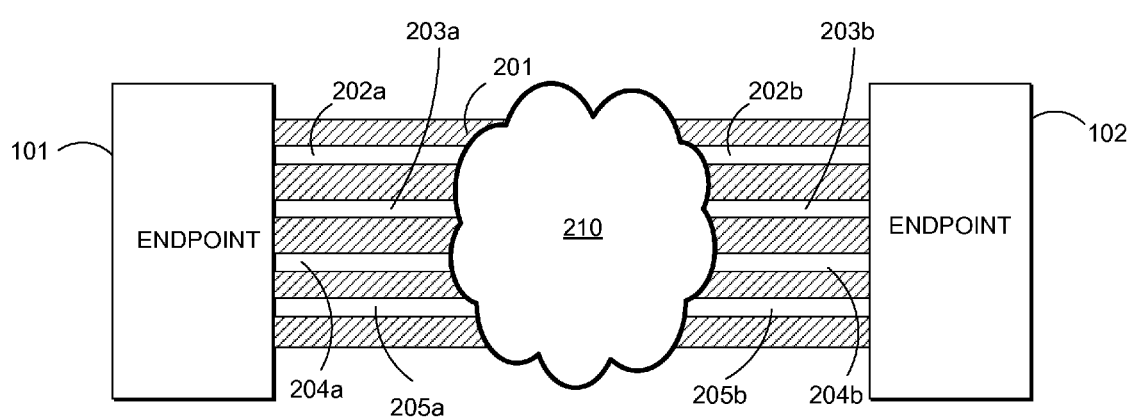
FIG. 2 is a representative view of a sending endpoint and a receiving endpoint, connected via multiple communication channels, on which another example embodiment may be implemented.

FIG. 2 is a representative view of a sending endpoint and a receiving endpoint, connected via multiple communication channels, on which another example embodiment may be implemented. More specifically, as shown in FIG. 2, sending endpoint 101 is connected to network 210 via a single physical interface 201. In addition, receiving endpoint 102 is connected to network 210 via the single physical interface 201. In this example embodiment, the single physical interface 201 includes communication channels 202a to 205a at the sending endpoint 101 and 202b to 205b at the receiving endpoint 102; however, in other embodiments, the single physical interface can include more than four communication channels.

In this embodiment, the connection over the single physical interface 201 includes a logical characteristic and a physical characteristic. The physical characteristic is a physical aspect on which the communication channels are carried, such as, for example, Ethernet (twisted cable), Wireless (802.11#), coax cable and fiber optic cable. In other words, the physical characteristic is the physical medium on which the communication channels travel upon, providing data to and from the endpoints. The logical characteristic is a segmentation of data via a port. In a simplistic illustrative example, consider the human communication method known as the postal service. In the postal service example, a piece of mail is sent by an individual from one household which contains four additional individuals. The individual may have sent the piece of mail to another household which contains six individuals. When the individual sends the mail via the postal service (a single medium), the postal service knows how to direct the mail to the post service closest to the intended receiver of the sent piece of mail. Once the mail has arrived at the intended receiver's household, it is provided to the appropriate individual. In this example, a single medium (the postal service) manages multiple data content and sends the data content to the correct receiver. In a more direct example, an Ethernet (e.g., twisted pair wire) can be used as a medium which uses multiple ports on which to connect the multiple communication channels between the sending endpoint and the receiving endpoint.

In addition, in this example embodiment, communication channels 202a, 202b, 203a and 203b have a connection-oriented protocol for sending data, and communication channels 204a, 204b, 205a and 205b have a connectionless-oriented protocol for sending data. Or, in another example embodiment, communication channels 202a, 202b, 203a and 203b have a connectionless-oriented protocol, and communication channels 204a, 204b, 205a and 205b have a connection-oriented protocol. In other embodiments which have more than four communication channels, a number of variations can exist in which each of the communication channels either has a connection-oriented protocol or a connectionless-oriented protocol, so long as at least two communication channels have a connection-oriented protocol and two communication channels have a connectionless-oriented protocol.

Figure 3:
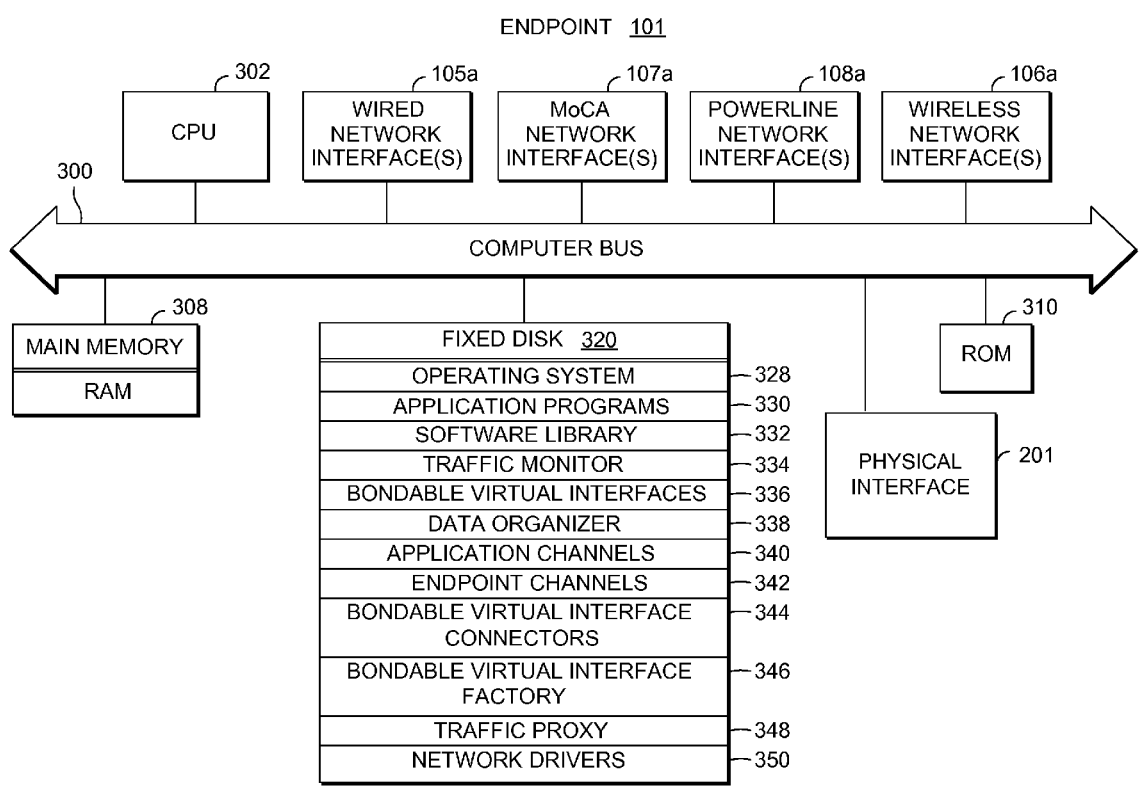
FIG. 3 is a detailed block diagram for explaining the internal architecture of the sending endpoint of FIGS. 1 and 2.

FIG. 3 is a detailed block diagram for explaining the internal architecture of the sending endpoint 101 of FIG. 1. As shown in FIG. 3, sending endpoint 101 includes central processing unit (CPU) 302 which interfaces with computer bus 300. Also interfacing with computer bus 300 are hard (or fixed) disk 320, physical interface 201, wired network interface(s) 105a, wireless network interface(s) 106a, MoCA network interface(s) 107a, powerline network interface(s) 108a, random access memory (RAM) 308 for use as a main runtime transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the sending endpoint 101 or other programs. Hard disk 320 further contains software library 332 for controlling the sending of data from sending endpoint 101. Hard disk 320 also contains traffic monitor 334 for gathering performance statistics for each of the multiple physical interfaces 105a, 106a, 107a and 108a. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 5 and 6. Traffic proxy 348 may be used as a communication interface between the software library 232 and the traffic monitor 334. Lastly, hard disk 320 contains network drivers 350 for software interface to networks such as networks 111, 112, 113 and 114.

In an example embodiment, software library 332 and traffic monitor 334 are loaded by CPU 302 into a region of RAM 308. CPU 302 then executes the stored software library 332 and the traffic monitor 334 from RAM 308 in order to execute the loaded computer-executable steps. In addition, application programs 330 are loaded by CPU 302 into a region of RAM 308. CPU 302 then executes the stored process steps as described in detail below in connection with FIGS. 8 to 12, in order to execute the loaded computer-executable steps.

Figure 4:
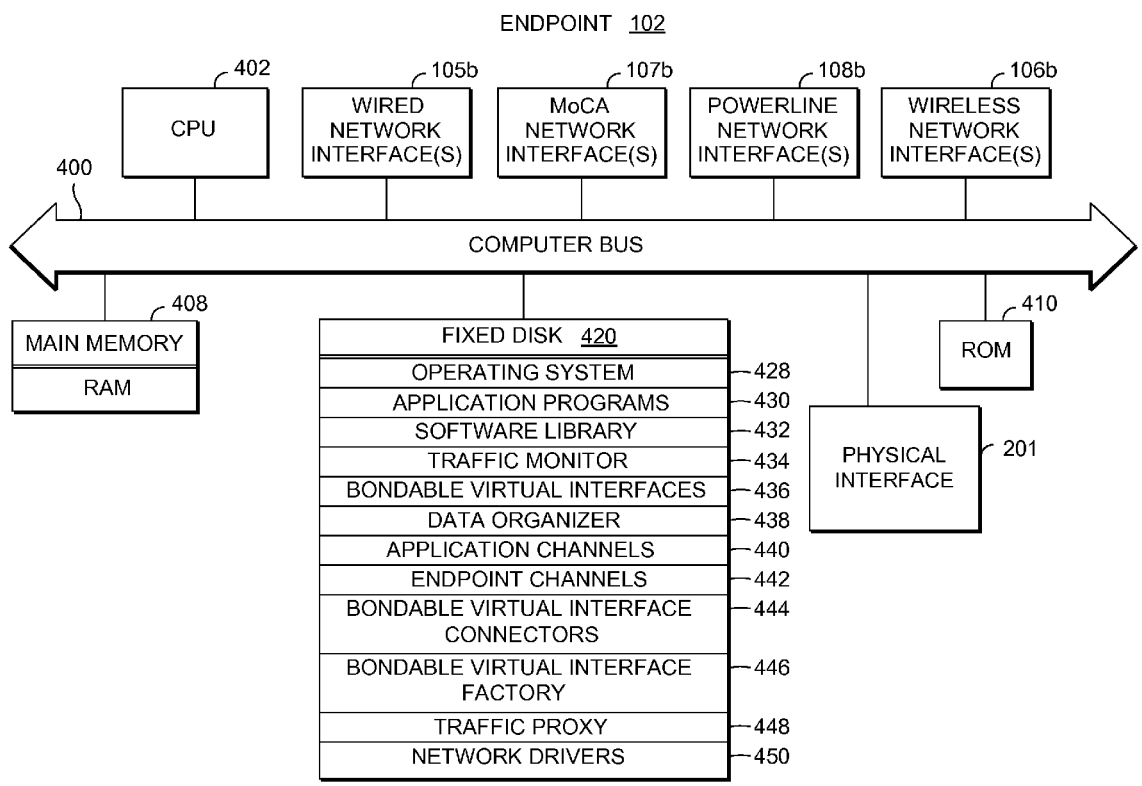
FIG. 4 is a detailed block diagram for explaining the internal architecture of the receiving endpoint of FIGS. 1 and 2.

FIG. 4 is a detailed block diagram for explaining the internal architecture of the receiving endpoint 102 of FIG. 1. As shown in FIG. 4, receiving endpoint 102 includes central processing unit (CPU) 402 which interfaces with computer bus 400. Also interfacing with computer bus 400 are hard (or fixed) disk 420, physical interface 201, wired network interface(s) 105b, wireless network interface(s) 106b, MoCA network interface(s) 107b, powerline network interface(s) 108b, random access memory (RAM) 408 for use as a main runtime transient memory, and read only memory (ROM) 410.

RAM 408 interfaces with computer bus 400 so as to provide information stored in RAM 408 to CPU 402 during execution of the instructions in software programs such as an operating system, application programs, and interface drivers. More specifically, CPU 402 first loads computer-executable process steps from fixed disk 420, or another storage device into a region of RAM 408. CPU 402 can then execute the stored process steps from RAM 408 in order to execute the loaded computer-executable process steps. In addition, data such as gathered network performance statistics or other information can be stored in RAM 408, so that the data can be accessed by CPU 402 during the execution of computer-executable software programs, to the extent that such software programs have a need to access and/or modify the data.

As also shown in FIG. 4, hard disk 420 contains operating system 428, application programs 430 such as programs for starting up and shutting down the receiving endpoint 102 or other programs. Hard disk 420 further contains software library 432 for controlling the receiving of data from receiving endpoint 102.

Software library 432 in this example is identical to software library 332 in sending endpoint 101. However, in other embodiments, the software library 432 need not be identical to library 332, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 420 also contains traffic monitor 434 for gathering performance statistics for each of the multiple physical interfaces 105b, 106b, 107b and 108b. In addition, hard disk 420 contains bondable virtual interfaces 436, data organizer 438, application channels 440, endpoint channels 442, bondable virtual interface connectors 444, bondable virtual interface factory 446, and traffic proxy 448, each of which is instantiated by the software library 432 and will be described in more detail below with reference to FIGS. 5 and 6. Traffic proxy 448 may be used as a communication interface between the software library 432 and the traffic monitor 434. Lastly, hard disk 420 contains network drivers 450 for software interface to networks such as networks 111, 112, 113 and 114.

In an example embodiment, software library 432 and traffic monitor 434 are loaded by CPU 402 into a region of RAM 408. CPU 402 then executes the stored process steps of the software library 432 and the traffic monitor 434 from RAM 408 in order to execute the loaded computer-executable steps. In addition, the process steps of the application programs 430 are loaded by CPU 402 into a region of RAM 408. CPU 402 then executes the stored process steps as described in detail below in connection with FIGS. 8 to 12, in order to execute the loaded computer-executable steps.

Figure 5:
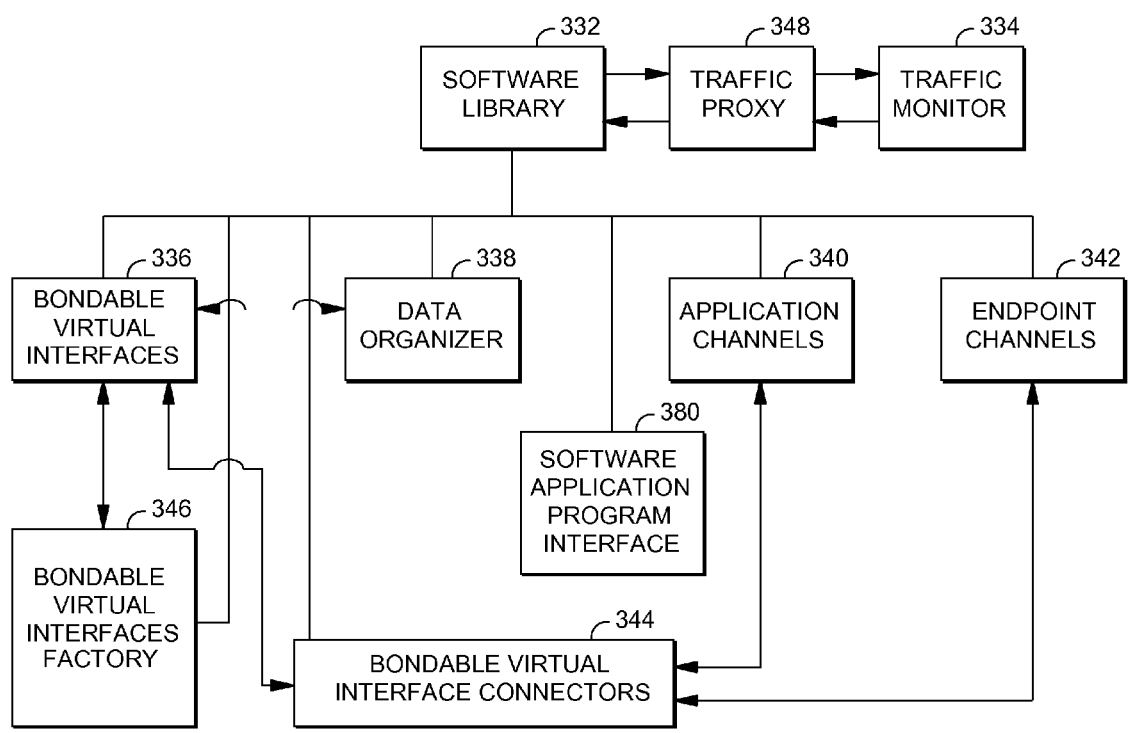
FIG. 5 is a high level view of an architecture according to an example embodiment.

FIG. 5 is a high level view of an architecture according to an example embodiment. As shown in FIG. 5, the architecture includes software library 332 and traffic monitor 334. The software library 332 is connected to and communicates with the traffic monitor 334 through traffic proxy 348. In this regard, the software library 332 instantiates and associates with the traffic monitor 334 via the traffic proxy 348. However, the traffic proxy 348 may be omitted, and the software library 332 and the traffic monitor 334 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 5, the software library 332 is connected to bondable virtual interfaces 336, bondable virtual interface factory 346, data organizer 338, software application program interface 380, application channels 340, and endpoint channels 342. In this regard, the software library 332 instantiates and associates with the bondable virtual interfaces 336, the bondable virtual interface factory 346, the data organizer 338, the software application program interface 380, the application channels 340, and the endpoint channels 342. In addition, the data organizer 338 instantiates a data splitter or a data combiner (both of which are described below in detail in connection with FIG. 6), depending on whether the architecture is implemented on a sending endpoint or a receiving endpoint. The foregoing mentioned components will be described, including their use and functionality, in more detail below in connection with FIG. 6.

Furthermore, the bondable virtual interface factory 346 is connected to and associates with the bondable virtual interfaces 336. The bondable virtual interfaces 336 are also connected to and associate with the data organizer 338 and the bondable virtual interface connectors 344. The bondable virtual interface connectors 344 also associate with application channels 340 and endpoint channels 342.

Figure 6:
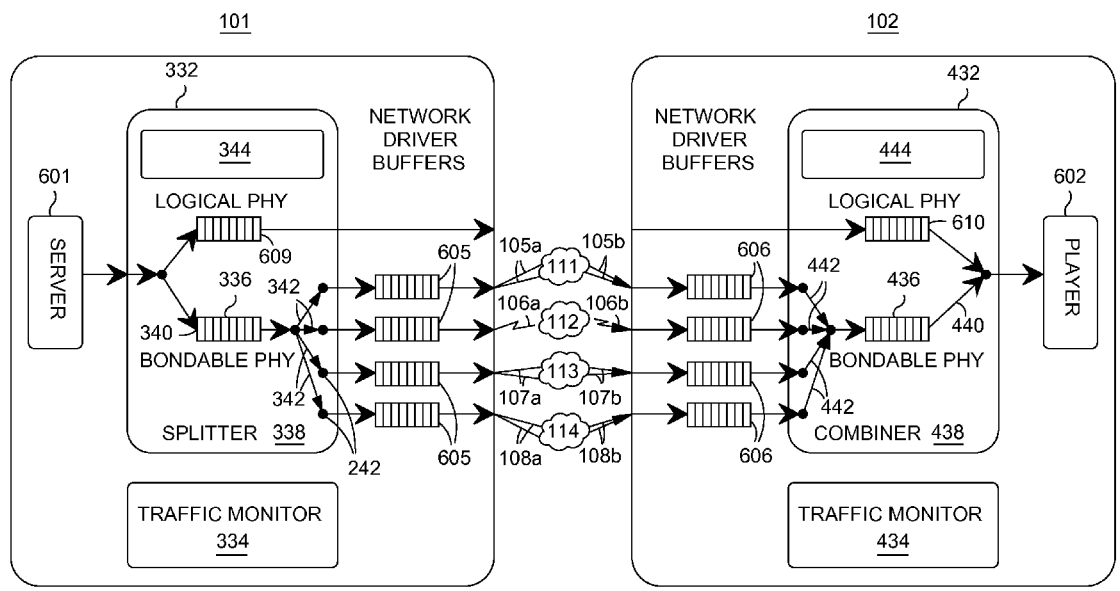
FIG. 6 is another view of a sending endpoint and a receiving endpoint, for providing a general explanation of an example embodiment.

The above-mentioned architecture will now be described in more detail in connection with FIG. 6. FIG. 6 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by multiple networks (111, 112, 113, 114 of FIG. 1). Each of the sending endpoint 101 and the receiving endpoint 102 has multiple physical interfaces (105a and b, 106a and b, 107a and b and 108a and b of FIG. 1), each for interfacing to a respective one of the multiple networks. The architecture for controlling the streaming of the data is implemented on both the sending endpoint 101 and the receiving endpoint 102.

As shown in FIG. 6, the architecture on the sending endpoint 101 includes a software library 332 and a traffic monitor 334. The traffic monitor 334 is for gathering performance characteristics of each of the multiple communication channels. More specifically, the traffic monitor 334 is an operating system-specific application or (daemon) service that provides the software library 332 with all of the available communication channels, and with individual communication channel performance/traffic statistics and data. The traffic monitor 334 may obtain network status by periodically making system calls to system's data structures to acquire statistics for each communication channel of the sending endpoint 101. The traffic monitor 334 communicates information back and forth between the software library 332. As shown in FIG. 6, the traffic monitor 334 communicates directly with the software library 332; however, in other embodiments, the traffic monitor 334 can communicate with the software library 332 via traffic proxy 348 as described above in connection with FIG. 5.

The software library 332 is for controlling the sending of the data stream from the sending endpoint 101. In controlling the sending of data, the software library 332 instantiates a plurality of bondable virtual interfaces 336 and a data organizer 338. In addition, the software library 332 instantiates logical interfaces 609. The logical interface 609 is an abstraction of an interface, which has a uniform interface. In addition, the bondable virtual interfaces 336 are instantiated by the software library based on the information communicated by the traffic monitor 334, for splitting the data stream into multiple data substreams at the sending endpoint 101. A bondable virtual interface is a clustering of two or more logical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 336 for splitting the data stream. At the sending endpoint 101, the data organizer 338 instantiates a data splitter 338 for implementing the designated one of the plurality of bondable virtual interfaces 336 at the sending endpoint 101. In this regard, the data organizer 338 is a parent object for the data splitter, and includes functionality for the registration of new or added bondable virtual interfaces. Moreover, the data organizer 338 is inherited by the data splitter 338. The data splitter 338 contains the bondable virtual interfaces 336 class implementation, and contains the associated behavior for splitting the input data stream onto the multiple communication channels.

Similar to the sending endpoint 101, in the receiving endpoint 102, the architecture includes a software library 432 and a traffic monitor 434. The traffic monitor 434 is for gathering performance characteristics of each of the multiple communication channels. More specifically, the traffic monitor 434 is an operating system-specific application or (daemon) service that provides the software library 432 with all of the available communication channels and with individual communication channel performance/traffic statistics and data. The traffic monitor 434 may obtain network status by periodically making system calls to system's data structures to acquire statistics for each communication channel of the receiving endpoint 102. The traffic monitor 434 communicates information back and forth between the software library 432. In FIG. 6, the traffic monitor 434 communicates directly with the software library 432; however, in other embodiments, the traffic monitor 434 can communicate with the software library 432 via a traffic proxy as described above in connection with FIG. 5.

The software library 432 is for controlling the receiving of the data stream at the receiving endpoint 102. In controlling the receiving of data, the software library 432 instantiates a plurality of bondable virtual interfaces 436 and a data organizer 438. In addition, the software library 432 instantiates logical interfaces 610. The logical interfaces 610 are substantially the same as logical interfaces 609, and provide the same functions. The bondable virtual interfaces 436 are instantiated by the software library based on the information communicated by the traffic monitor 434, for combining the multiple data sub-streams into the data stream at the receiving endpoint 102. In addition, the data organizer is for designating one of the plurality of bondable virtual interfaces 436 for combining the data stream.

At the receiving endpoint 102, the data organizer 438 instantiates a data combiner 438 for implementing the designated one of the plurality of bondable virtual interfaces 436 at the receiving endpoint 102. In this regard, the data combiner 438 is a parent object for the data combiner 438, and includes functionality for the registration of new or added bondable virtual interfaces. Moreover, the data organizer 438 is inherited by the data combiner 438. The data combiner 438 contains the bondable virtual interfaces 436 class implementation, and contains the associated behavior for combining multiple input streams into a resulting single data stream.

At startup of the architecture, the data splitter 338 and the data combiner 438 read network statistics provided by the traffic monitor 334 and 434. The traffic monitors' network statistics are updated periodically.

As further shown in FIG. 6, the sending endpoint 101 and the receiving endpoint 102 are each connected to one or more applications, such as application server 601 and application player 602, respectively. In this regard, the software library 332 of the sending endpoint 101 and the software library 432 of the receiving endpoint 102 further instantiate one or more application channels 340 and 440, respectively, connecting the software libraries 332 and 432 to one or more applications 601 and 602, respectively. The one or more application channels 340 write data to the software library 332, the written data having been received by the sending endpoint 101 from the one or more applications 601. In addition, the one or more application channels 440 read data from the software library 432, the read data having been sent from the receiving endpoint 102 to the one or more applications 602 connected to the receiving endpoint 102. For the application channels, a "named-socket" can be used, which provides a very similar interface to the traditional "single socket" approach in common usage. Moreover, the one or more application channels 340 and 440 include an event handling mechanism to indicate when there is data to be read from or written to the software libraries 332 and 432. The event handling mechanism for a named-socket is a select; however, many other means can be used for triggering events on the application channels.

As shown in FIG. 6, the software libraries 332 and 432 further instantiate multiple endpoint channels 342 and 442, respectively, connecting the software libraries 332 and 432 to the multiple communication channels 105a to 108a and 105b to 108b through network driver buffers 605 and 606. The multiple endpoint channels 342 and 442 write data to the software library 432, the written data having been received at the receiving endpoint 102 from the sending endpoint 101, and read data from the software library 332, the read data having been sent from the sending endpoint 101 to the receiving endpoint 102. The multiple endpoint channels 342 and 442 include an event handling mechanism to indicate when there is data to be read from or written to the multiple communication channels 105a and 105b to 108a and 108b. In addition, the network driver buffers 605 and 606 are provided to store data before sending data on the sending side, and before reconstructing the data stream and providing the single data stream to the application player 602 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used.

The bondable virtual interfaces 336 and 436, as shown in FIG. 6, are created by the data splitter 338 or the data combiner 438 to perform the splitting or combining of the data stream. The bondable virtual interfaces 336 and 436 conform to an interface, which allows them to be used generically in the framework. In other words, one bondable virtual interface could be substituted with another bondable virtual interface quite easily without changing any interface requirements elsewhere in the software library, or in an application.

In addition, the bondable virtual interfaces 336 and 436 have the basic functionality to split or combine data (based upon the role provided by the data splitter 338 or the data combiner 438). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Three examples of such bondable virtual interfaces are: a simple TCP Bondable virtual interface, a simple UDP bondable virtual interface, and a feedback TCP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface consisting of multiple physical network interfaces, and sending data with each interface using standard UDP datagrams.

A feedback TCP bondable virtual interface is a bondable virtual interface which utilizes feedback from the receiving endpoint to change the manner in which data is sent over multiple physical network interfaces using TCP connections.

Furthermore, the software libraries 332 and 432 further instantiate a plurality of bondable virtual interface connectors 344 and 444, respectively. Each bondable virtual interface connector is associated with a specific bondable virtual interface. The bondable virtual interface connectors 344 and 444 ensure that the connections between the software libraries 332 and 432 and the multiple physical interfaces 105a to 108a and 105b to 108b via the multiple endpoint channels 342 and 442, respectively, are ready to accept data before sending data from the sending endpoint 101 to the receiving endpoint 102. In addition, the bondable virtual interface connectors 344 and 444 ensure that the connections between the software libraries 332 and 432 and the one or more applications 601 and 602 via the one or more application channels 340 and 440, respectively, are ready to accept data before sending data from the sending endpoint 101 to the receiving endpoint 102.

Furthermore, the software libraries 332 and 432 each further comprise a software application program interface 380, as described in connection with FIG. 5, which consists of a set of commands used by the one or more applications 601 and 602 to utilize the architecture. In addition, the software libraries 332 and 432 each instantiate a bondable virtual interface factory 346, as described in connection with FIG. 5, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 334 and 434 may communicate with the software libraries 332 and 432, respectively, via a traffic proxy. In this case, the software libraries 334 and 434 each further instantiate a traffic proxy 348 (as described in connection with FIGS. 3 and 5) and a traffic proxy 448 (as described in connection with FIG. 4) for communicating information between the traffic monitors 334 and 434 and the software libraries 332 and 432, respectively, via a shared common interface. The common interface is a shared library, which contains objects containing information and the means to share this common data between the traffic monitors 332 and 432 and the traffic proxies 348 and 448. The transport mechanism can be changed easily and additional information can be added (e.g., by adding new objects). Furthermore, in cases where the bondable virtual interface uses some form of feedback mechanism, traffic problems identified by feedback will be relayed to the traffic monitors 334 and 434 via the traffic proxies 348 and 448.

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

In the above description with respect to FIGS. 3 to 6, use of the software library can lead to certain efficiencies and programming conveniences, but its use is not mandatory and other libraries can be used, or no library at all, so long as the features of the claims are achieved. A more detailed discussion of the software library can be found in U.S. application Ser. No. 12/463,366, filed May 8, 2009, titled "Efficient Network Utilization Using Multiple Physical Interfaces", by Martin Martinez, et al., the content of which is incorporated by reference herein.

Figure 7:
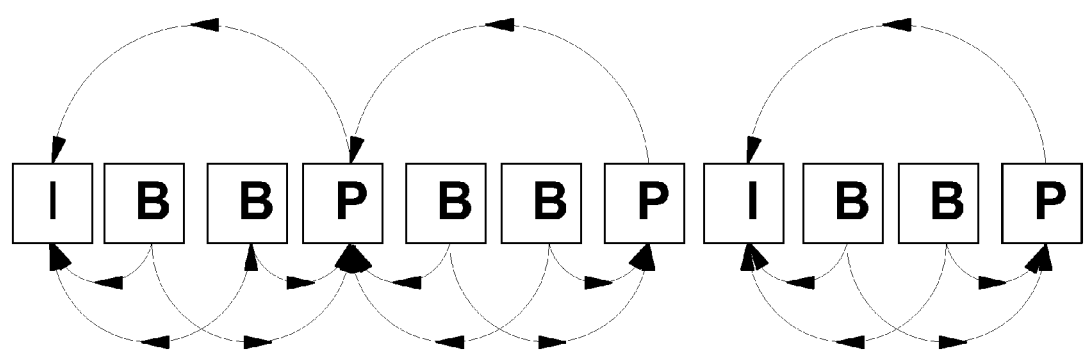
FIG. 7 shows a typical example of a video stream.

FIG. 7 shows a typical compressed video stream. As shown in FIG. 7, a typical video stream consists of intra-frame coded frames and inter-frame coded frames. In FIG. 7, the intra-frame coded frames are represented by "I" blocks, and the inter-frame coded frames are represented by "P" and "B" blocks. In this regard, I-frames are examples of intra-frame coded frames, which are key frames of the video stream. In addition, P-frames and B-frames are examples of inter-frame coded frames, which are less important than intra-frame coded frames. However, in some cases, some inter-frame coded frames may be as important as the intra-frame coded frames. The example I-frames are encoded as a single image, with no reference to any past or future frames. The example P-frames are encoded relative to the past reference frame, which is the closest preceding of either an I-frame or a P-frame, as shown by the arrows in FIG. 7. The example B-frames are encoded relative to the past reference frame, the future reference frame, or both frames, as indicated by the arrows in FIG. 7. The future reference frame is the closest following reference frame which is either an I-frame or a P-frame.

Figure 8:
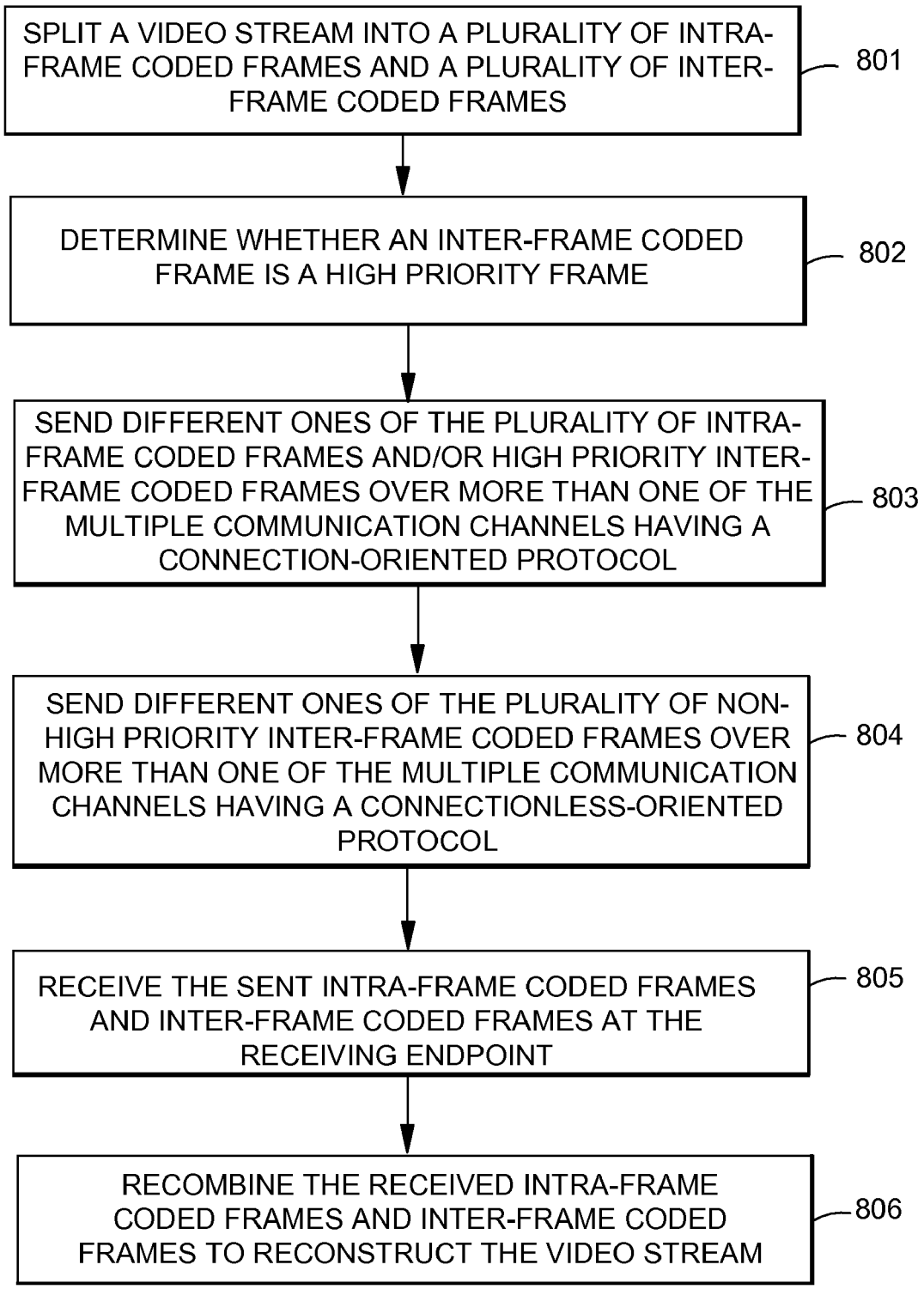
FIG. 8 is a flow chart for providing a detailed explanation of another example embodiment.

FIG. 8 is a flowchart for providing a detailed explanation of this example embodiment. More specifically, FIG. 8 depicts a flowchart for providing a detailed explanation of an example embodiment, in which a video is streamed from a sending endpoint 101 to a receiving endpoint 102 (as shown in FIGS. 1 and 2). Both of the sending endpoint 101 and the receiving endpoint 102 each have multiple communication channels (105a and 105b to 108a and 108b of FIG. 1 or 202a to 205a and 202b to 205b of FIG. 2) connecting the sending endpoint 101 and the receiving endpoint 102 to one or more networks, respectively. As described above in connection with FIGS. 1 and 2, in one example embodiment, the multiple communication channels are carried over multiple physical interfaces, or in another example embodiment, the multiple communication channels are carried over a single physical interface. In addition, as described above, the streaming video includes a plurality of intra-frame coded frames and a plurality of inter-frame coded frames.

As shown in FIG. 8, in step 801, the video stream is split into a plurality of intra-frame coded frames and a plurality of inter-frame coded frames. In this regard, the video stream is split into intra-frame coded frames and inter-frame coded frames in real-time (i.e., as the video is being streamed and just before the video stream is sent from the sending endpoint to the receiving endpoint). Each of the split intra-frame coded frames and inter-frame coded frames has header information which includes an original order of the frames, so that the receiving endpoint 102 can reconstruct the video stream in the proper order.

In this example embodiment, splitting, as defined herein, is based on dynamically changing network conditions, such as data capacity throughput, which may change due to network congestion or other traffic on the network (i.e., changing the amount of data sent to each communication channel) and upon content (i.e., sending the intra-frame coded frames to the communication channels which support connection-based sending). In addition, splitting includes the idea of sending data out of order to achieve or more closely approximate a correct reception order. In this regard, splitting, as used herein, should be distinguished from striping, which is usually used in conjunction with disk arrays, and is typically based specifically on fixed hardware characteristics of a system in question (e.g., striping includes bus design (sending bytes or bits to different devices) or RAID array configuration. In addition, striping usually involves dividing sequential data into sub-components and sending the sub-components simultaneously. Striping also often includes the concept of sending redundant or parity information to aid in recovery of corrupted data, which should not be confused with splitting as used herein.

In step 802, a determination is made as to whether an inter-frame coded frame is or is not a high priority frame. In this regard, an inter-frame coded frame is a high priority frame if a number of references to the inter-frame coded frame by other inter-frame coded frames is more than a threshold number. The threshold number may be set by a user, or may be determined based upon a number of frames that are dropped before a quality of service (QoS) is reduced such that the reduction in QoS is noticeable to a viewer. The number of frames that can be dropped before a QoS is reduced such that the reduction is noticeable to a viewer may be determined by gathering empirical data of viewers watching video with different numbers of frames being dropped.

Different ones of the plurality of intra-frame coded frames are then sent, from the sending endpoint 101 to the receiving endpoint 102, over more than one of the multiple communication channels having a connection-oriented protocol (803). The plurality of intra-frame coded frames may be sent, for example, in a round-robin fashion, proportional to a data capacity throughput, or out of order. The step of sending different ones of the plurality of intra-frame coded frames over more than one of the multiple communication channels having a connection-oriented protocol is described in greater detail below in connection with FIGS. 9 to 12.

In step 803, different ones of the plurality of inter-frame coded frames which are determined to be high priority frames in step 802, are sent over more than one of the multiple communication channels having a connection-oriented protocol. Similar to the plurality of intra-frame coded frames described above, the plurality of inter-frame coded frames which are determined to be high priority frames may be sent, for example, in a round-robin fashion, proportional to a data capacity throughput, or out of order. The step of sending different ones of the plurality of inter-frame coded frames which are determined to be high priority frames over more than one of the multiple communication channels having a connection-oriented protocol is described in greater detail below in connection with FIGS. 9 to 12.

Different ones of the plurality of inter-frame coded frames which are determined not to be high priority frames are then sent, from the sending endpoint 101 to the receiving endpoint 102, over more than one of the multiple communication channels having a connectionless-oriented protocol (804). The plurality of non-high priority inter-frame coded frames may be sent, for example, in a round-robin fashion, proportional to a data capacity throughput, or out of order. The step of sending different ones of the plurality of non-high priority inter-frame coded frames over more than one of the multiple communication channels having a connectionless-oriented protocol is described in greater detail below in connection with FIGS. 9 to 12.

In step 805 of FIG. 8, the sent intra-frame coded frames and inter-frame coded frames are received at the receiving endpoint 102. The intra-frame coded frames and inter-frame coded frames received in step 805 are then recombined at the receiving endpoint 102 to reconstruct the video stream (806). In this regard, the receiving endpoint 102 uses the header information attached to each frame to reconstruct the video stream in the proper order.

By virtue of the foregoing example embodiment, it is ordinarily possible to ensure delivery of important reference frames (i.e., intra-frame coded frames and high priority inter-frame coded frames) of a streaming video, while reducing delay of the streaming video and congestion within a network, which in turn reduces any possible degradation of the quality of the video stream. More specifically, because different ones of the intra-frame coded frames and different ones of the high priority inter-frame coded frames of the streaming video are sent over more than one of multiple communication channels having a connection-oriented protocol, the intra-frame coded frames and the high priority inter-frame coded frames are more likely to be successfully delivered than if the intra-frame coded frames and the high priority inter-frame coded frames were sent over a connectionless-oriented protocol. Also, the intra-frame coded frames are delivered more quickly and with less delay since the intra-frame coded frames are sent over multiple communication channels. Furthermore, because different ones of less important frames (i.e., inter-frame coded frames which are not high priority frames) are sent over more than one of multiple communication channels having a connectionless-oriented protocol, any possible delay in streaming the video may be reduced because less data is sent using a connection-oriented protocol.

In addition, an advantageous effect may be obtained by virtue of the foregoing example embodiment when there is asymmetry between a data capacity throughput upload speed on the sending endpoint and a data capacity throughput download speed on the receiving endpoint. More specifically, because both the intra-frame coded frames and the inter-frame coded frames are split and sent over more than one communication channel at the sending endpoint, it may be possible to provide a faster upload speed when the maximum upload speed is asymmetrically slower than the maximum download speed. Such asymmetry is common, for example, in asymmetric digital subscriber lines (ADSL) and cable. Such an advantage may be particularly evident in embodiments where the sending endpoint has multiple physical interfaces, since the speed of each individual interface is essentially accumulated into a larger effective speed.

In addition, in step 801, before the video stream is split into the plurality of intra-frame coded frames and the plurality of inter-frame coded frames, an amount of preloaded data including both intra-frame coded frames and inter-frame coded frames is sent over one of the multiple communication channels having a connection-oriented protocol. The amount of preloaded data is determined based upon a size of a buffer included in the receiving endpoint and a playback rate of the video stream at the receiving endpoint. Once the preloaded data is sent, then the process proceeds starting with step 801. Since an amount of preloaded data is sent before splitting and sending the frames over different communication channels, enough time can be allowed to pass so that accurate determinations can be made with respect to the expected difference in arrival times between the different communication channels. Thus, preloaded data may be sent at the start of a movie where not enough information is available to provide appropriate communication time deltas which will be described in greater detail below in connection with FIGS. 10 to 12. In addition, an amount of preloaded data may be provided so that if an error occurs there is sufficient time for a corrected frame to be sent.

In an example, the buffer at the receiving endpoint may be capable of holding 10 Mb of data, and the playback rate of the video stream may be 1 Mb/s. In this example, 5 Mb of preloaded data may be sent before splitting and sending the individual frames, so that there is a sufficient amount of buffer time in a case that an error occurs and a corrected frame is sent.

In step 805, in a case that an inter-frame coded frame is not received by the receiving endpoint 102, feedback is sent from the receiving endpoint 102 to the sending endpoint 101 indicating the inter-frame coded frame that was not received. The inter-frame coded frame is then re-sent over one of the multiple communication channels having a connection-oriented protocol. In a case that feedback is provided via a group of multiple communication channels that use a connection-oriented protocol, a forward channel may be used to the send the lost data.

Figure 9:
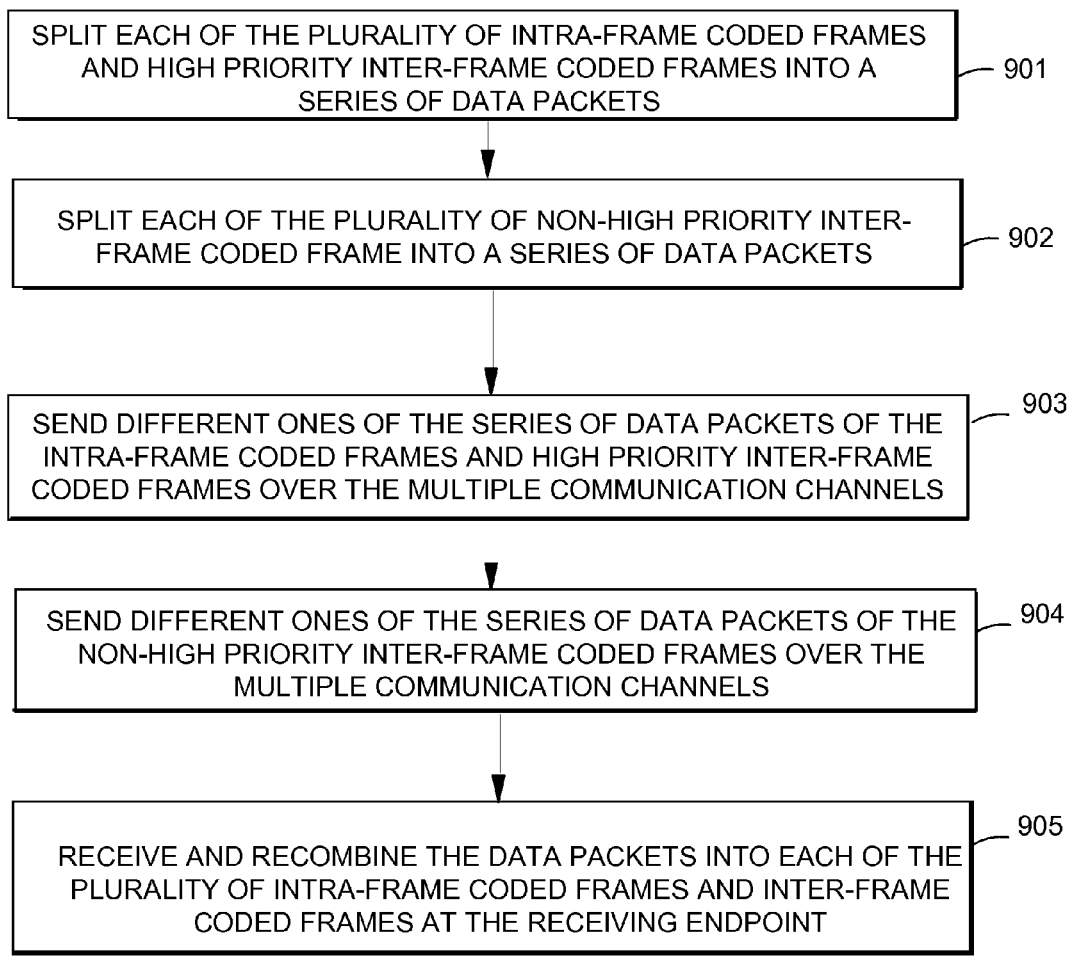
FIG. 9 is a flow chart, according to an additional example embodiment, for further defining step 803 of FIG. 8.

FIG. 9 is a flow chart, according to an additional example embodiment, for further defining step 803 of FIG. 8. As depicted in FIG. 9, when sending intra-frame coded frames or high priority inter-frame coded frames in step 803 of FIG. 8, each of the plurality of intra-frame coded frames and high priority inter-frame coded frames is split into a series of data packets (901). In addition, when sending non-high priority inter-frame coded frames in step 804 of FIG. 8, each of the plurality of non-high priority inter-frame coded frames is split into a series of data packets (902). Different ones of the series of data packets of the intra-frame coded frames and high priority inter-frame coded frames are then sent by the sending endpoint 101 over the multiple communication channels having a connection-oriented protocol (903). Moreover, different ones of the series of data packets of the plurality of non-high priority inter-frame coded frames are then sent over the multiple communication channels having a connectionless-oriented protocol (904). The data packets are then received and recombined into each of the plurality of intra-frame coded frames and inter-frame coded frames at the receiving endpoint 102 (905). Each of the multiple data packets has header information which includes an original order of the data packets for each split frame, to enable the receiving endpoint 102 to recombine the multiple data packets into the intra-frame coded frame.

Because each of the intra-frame coded frames and inter-frame coded frames is split into data packets, and different ones of the data packets are sent over multiple communication channels, the frames may be delivered in an efficient manner by further utilizing the difference in data capacity throughput of each of the multiple communication channels. More specifically, the different data capacity throughputs of each of the multiple communication channels are further utilized because the size of chunks of data being sent is reduced, which in turn allows a more accurate apportionment of such data sent over a communication channel, based on a data capacity throughput of the communication channel.

Other embodiments exist with respect to the sending of the intra-frame coded frames and the inter-frame coded frames over the communication channels. For example, other embodiments for sending the intra-frame coded frames and the inter-frame coded frames can be found in U.S. application Ser. No. 12/575,428, filed Oct. 7, 2009, titled "Network Streaming of a Video Stream Over Multiple Communication Channels", by Martin Martinez, et al., the content of which is included by reference herein.

Figure 10A:
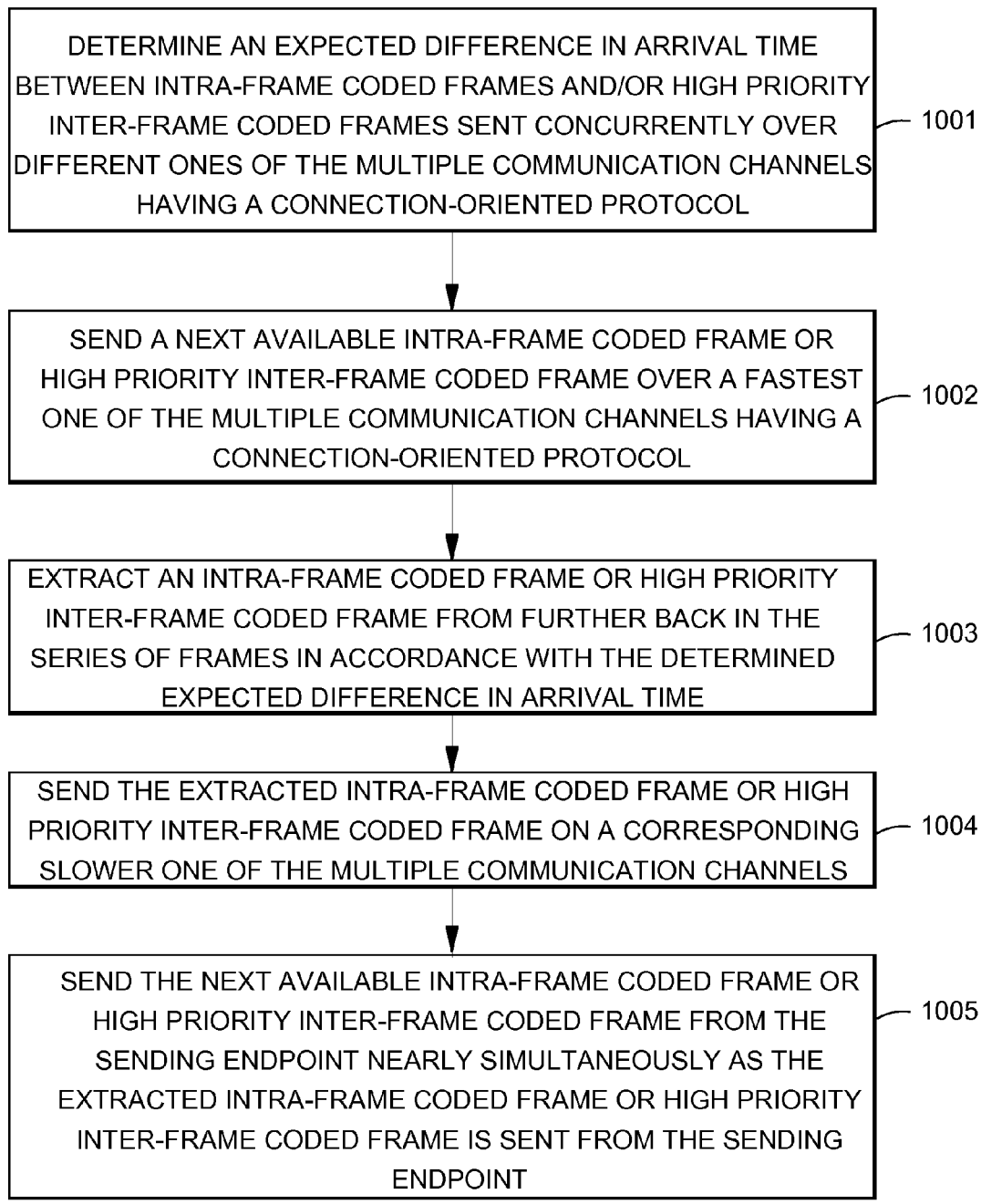
FIG. 10A is a flowchart, according to an additional example embodiment, for further defining step 803 of FIG. 8.

FIG. 10A is a flowchart, according to an additional example embodiment, for further defining step 803 of FIG. 8. In this example embodiment, the multiple communication channels which are used to send the data for intra-frame coded frames and high priority inter-frame coded frames may all not be of equal performance (i.e., have different data capacity throughputs). Thus, in step 1001 of FIG. 10A, a determination is made by the sending endpoint 101 as to an expected difference in arrival time between intra-frame coded frames and/or high priority inter-frame coded frames sent concurrently over different ones of the multiple communication channels having a connection-oriented protocol. A next available intra-frame coded frame or high priority inter-frame coded frame of the plurality of intra-frame coded frames and high priority inter-frame coded frames is then sent, from the sending endpoint 101 to the receiving endpoint 102, over a fastest one of the multiple communication channels having a connection-oriented protocol (1002). The fastest one of the multiple communication channels is determined based on the determined expected difference in arrival time.

In step 1003, an intra-frame coded frame or a high priority inter-frame coded frame is extracted from further back in the plurality of intra-frame coded frames or plurality of inter-frame coded frames in accordance with the determined expected difference in arrival time. The extracted intra-frame coded frame or high priority inter-frame coded frame is then sent, from the sending endpoint 101 to the receiving endpoint 102, on a corresponding slower one of the multiple communication channels having a connection-oriented protocol (1004). The next available intra-frame coded frame or high priority inter-frame coded frame is then sent from the sending endpoint 101 nearly simultaneously as the extracted intra-frame coded frame or high priority inter-frame coded frame is sent from the sending endpoint 101 (1005).

By virtue of the foregoing arrangement, it is ordinarily possible to ensure that intra-frame coded frames of the video stream are received at a receiving endpoint on time and in approximate order, which in turn minimizes any unnecessary processing requirements at the receiving endpoint. In this regard, the receiving endpoint may be, for example, a typical set top box, digital video recorder (DVR), or other consumer device such as a consumer device intended for use with a TV.

When compared with a typical desktop computer, laptop computer, or home server, the typical devices for a receiving endpoint are resource constrained having drastically less processing power, reduced memory, and smaller mass storage. However, the typical devices for the receiving endpoint will be tasked with, for example, receiving one or more streams of multimedia content, viewing and/or recording content from a cable or satellite TV provider, acting as an input/aggregation device for collecting pictures or uploading personal video content, purchasing and/or playing music, etc. In addition, in the above described arrangement of sending a single video stream over multiple communication channels, the receiving endpoint carries the additional burden of temporarily storing an unknown amount of data, and then reassembling the resulting data stream. Therefore, because intra-frame coded frames and high priority inter-frame coded frames are extracted out of order from further back in the series, and these extracted intra-frame coded frames and high priority inter-frame coded frames are sent over slower ones of the multiple communication channels so as to arrive in an approximate order of the original data stream, any unnecessary buffering and/or processing being performed by the receiving endpoint is minimized, which greatly reduces the load on an already overburdened receiving endpoint.

Figure 10B:
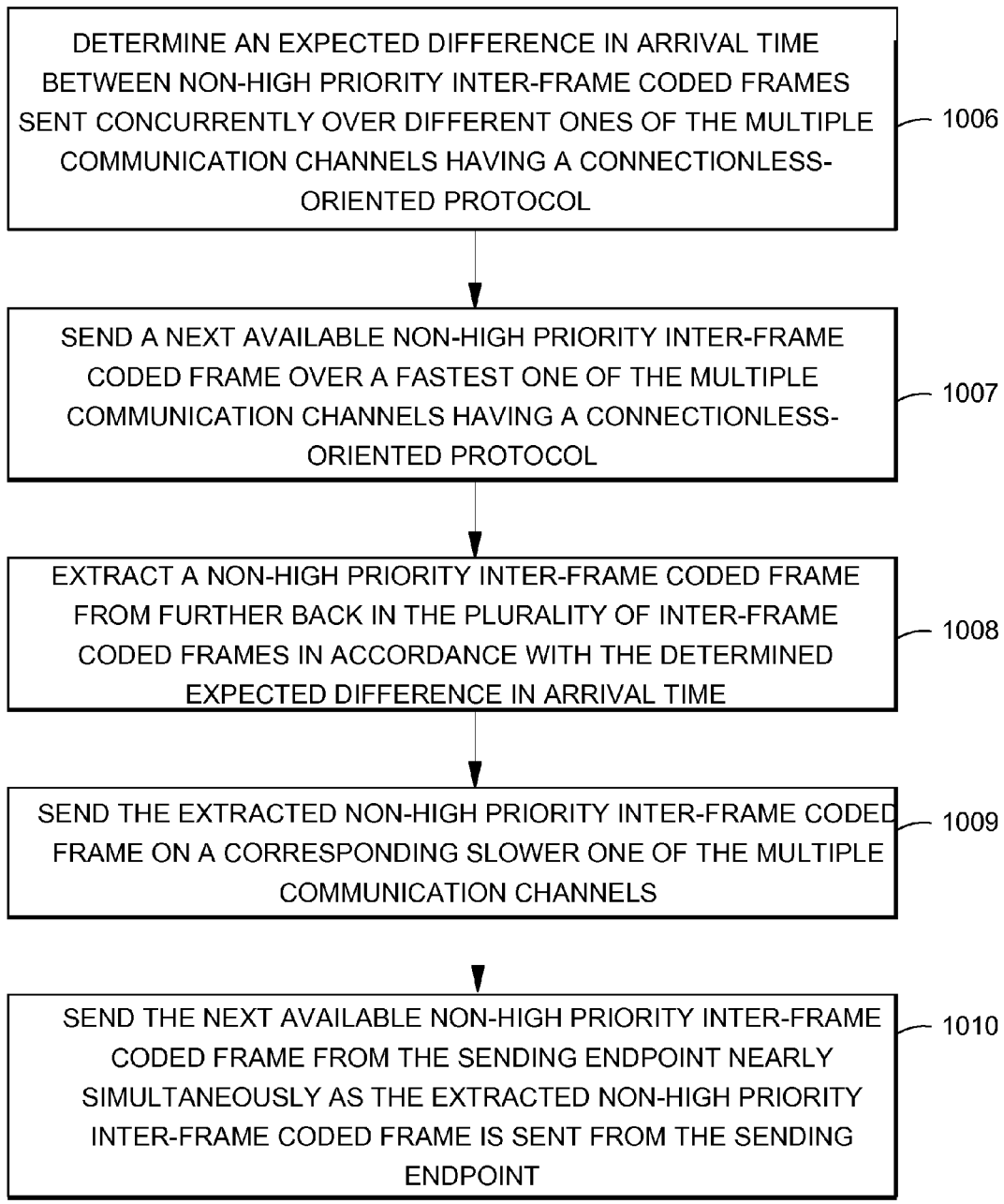
FIG. 10B is a flowchart, according to an additional example embodiment, for further defining step 804 of FIG. 8.

FIG. 10B is a flowchart, according to an additional example embodiment, for further defining step 804 of FIG. 8. In this example embodiment, the multiple communication channels which are used to send the data for non-high priority inter-frame coded frames may all not be of equal performance (i.e., have different data capacity throughputs). Thus, in step 1006 of FIG. 10B, a determination is made by the sending endpoint 101 as to an expected difference in arrival time for non-high priority inter-frame coded frames sent concurrently over different ones of the multiple communication channels having a connectionless-oriented protocol. A next available non-high priority inter-frame coded frame of the plurality of non-high priority inter-frame coded frames is then sent, from the sending endpoint 101 to the receiving endpoint 102, over a fastest one of the multiple communication channels having a connectionless-oriented protocol (1007). The fastest one of the multiple communication channels being determined based on the determined expected difference in arrival time.

In step 1008, a non-high priority inter-frame coded frame is extracted from further back in the plurality of non-high priority inter-frame coded frames in accordance with the determined expected difference in arrival time. The extracted non-high priority inter-frame coded frame is then sent, from the sending endpoint 101 to the receiving endpoint 102, on a corresponding slower one of the multiple communication channels having a connectionless-oriented protocol (1009). The next available non-high priority inter-frame coded frame is then sent from the sending endpoint 101 nearly simultaneously as the extracted non-high priority inter-frame coded frame is sent from the sending endpoint 101 (1010).

As is described above in FIG. 9, each of the plurality of intra-frame coded frames and high priority inter-frame coded frames may be split into a series of data packets, and each of the plurality of inter-frame coded frames may be split into a series of data packets. In this example embodiment, the processes of FIGS. 11A and 11B can be performed to efficiently stream the series of data packets of the intra-frame coded frames and high priority inter-frame coded frames, and to efficiently stream the series of data packets of the non-high priority inter-frame coded frames.

Figure 11A:
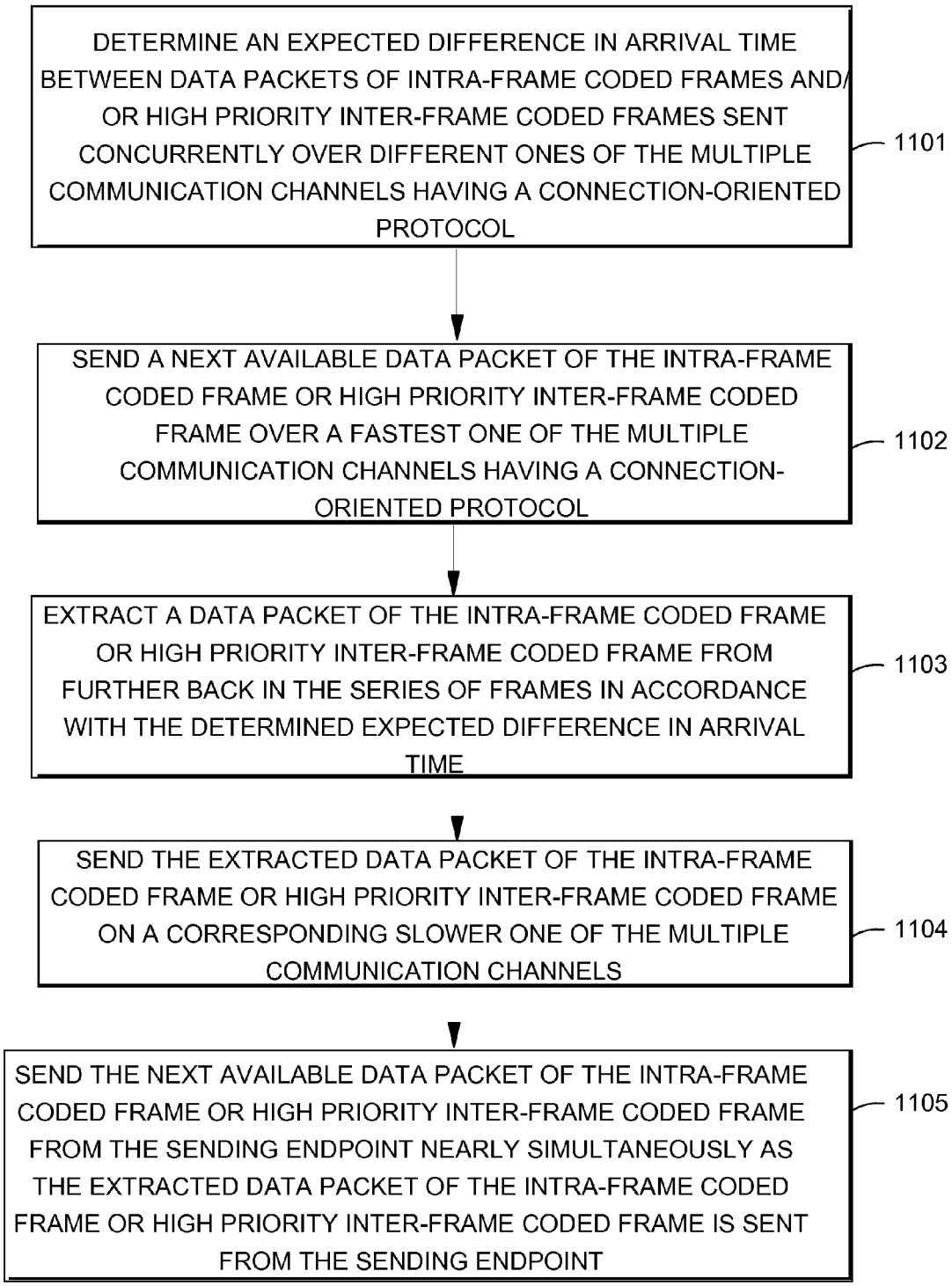
FIG. 11A is a flowchart, according to an additional example embodiment, for further defining step 803 of FIG. 8.

As shown in FIG. 11A, in step 1101, a determination is made by the sending endpoint 101 as to an expected difference in arrival time between data packets of the intra-frame coded frames and/or high priority inter-frame coded frames sent concurrently over different ones of the multiple communication channels having a connection-oriented protocol. A next available data packet of the series of data packets of the intra-frame coded frames and/or high priority inter-frame coded frames is sent over a fastest one of the multiple communication channels having a connection-oriented protocol (step 1102). The fastest one of the multiple communication channels is determined based on the determined expected difference in arrival time.

In step 1103, a data packet of the series of data packets of the intra-frame coded frames or the high priority inter-frame coded frames is extracted from further back in the series of data packets in accordance with the determined expected difference in arrival time. The extracted data packet is sent, from the sending endpoint 101 to the receiving endpoint 102, on a corresponding slower one of the multiple communication channels (step 1104). The next available data packet of the series of data packets of the intra-frame coded frames or the high priority inter-frame coded frames is sent from the sending endpoint 101 nearly simultaneously as the extracted data packet is sent from the sending endpoint 101 (step 1105).

Figure 11B:
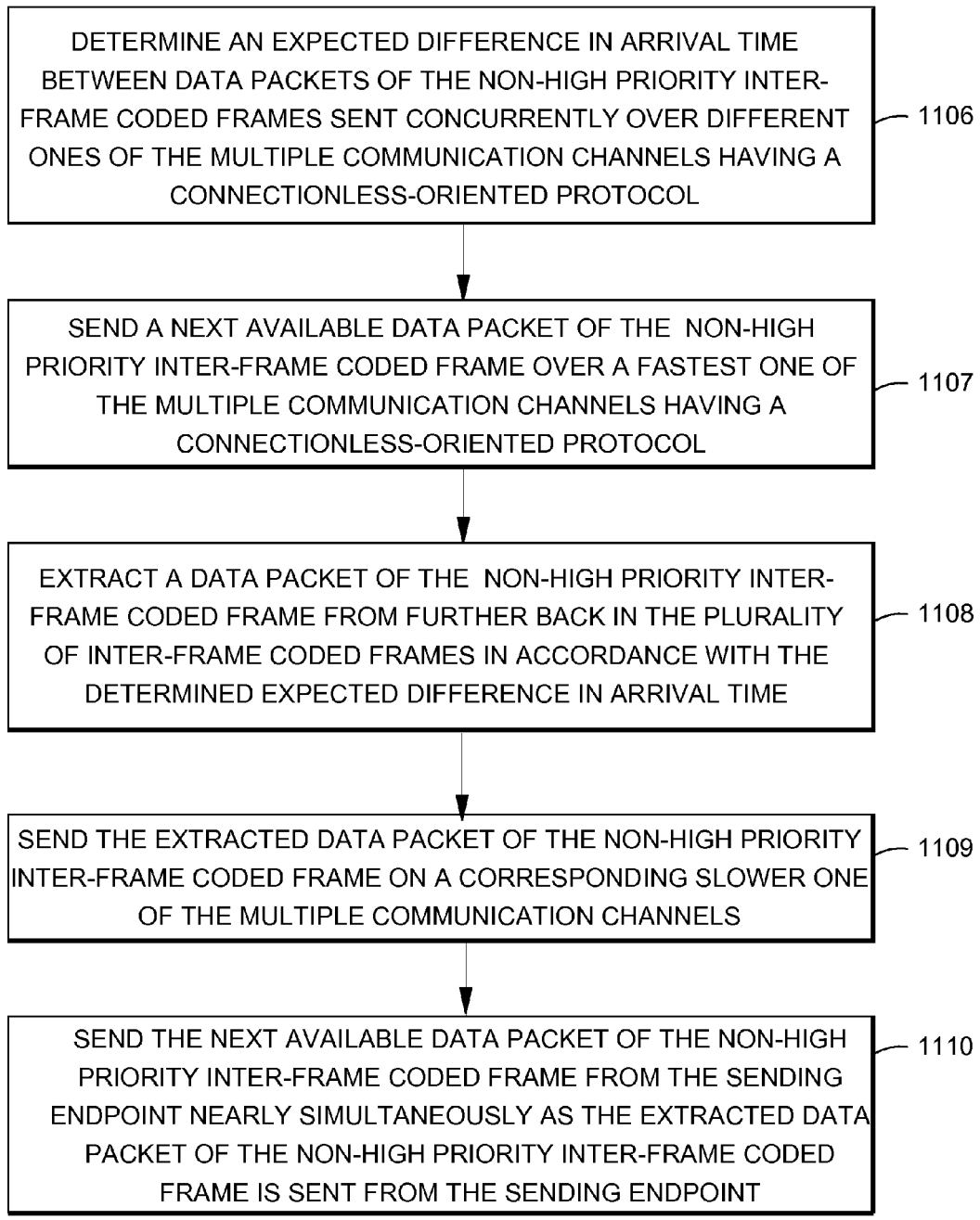
FIG. 11B is a flowchart, according to an additional example embodiment, for further defining step 804 of FIG. 8.

As shown in FIG. 11B, in step 1106, a determination is made as to an expected difference in arrival time between data packets of the non-high priority inter-frame coded frames sent concurrently over different ones of the multiple communication channels having a connectionless-oriented protocol. A next available data packet of the series of data packets of the non-high priority inter-frame coded frames is sent, from the sending endpoint 101 to the receiving endpoint 102, over a fastest one of the multiple communication channels having a connectionless-oriented protocol (step 1107). The fastest one of the multiple communication channels being determined based on the determined expected difference in arrival time.

In step 1108, a data packet of the series of data packets of the non-high priority inter-frame coded frames is extracted from further back in the series of data packets in accordance with the determined expected difference in arrival time. The extracted data packet is sent on a corresponding slower one of the multiple communication channels (step 1109). The next available data packet is sent from the sending endpoint 101 nearly simultaneously as the extracted data packet is sent from the sending endpoint 101 (step 1110).

Figure 12:
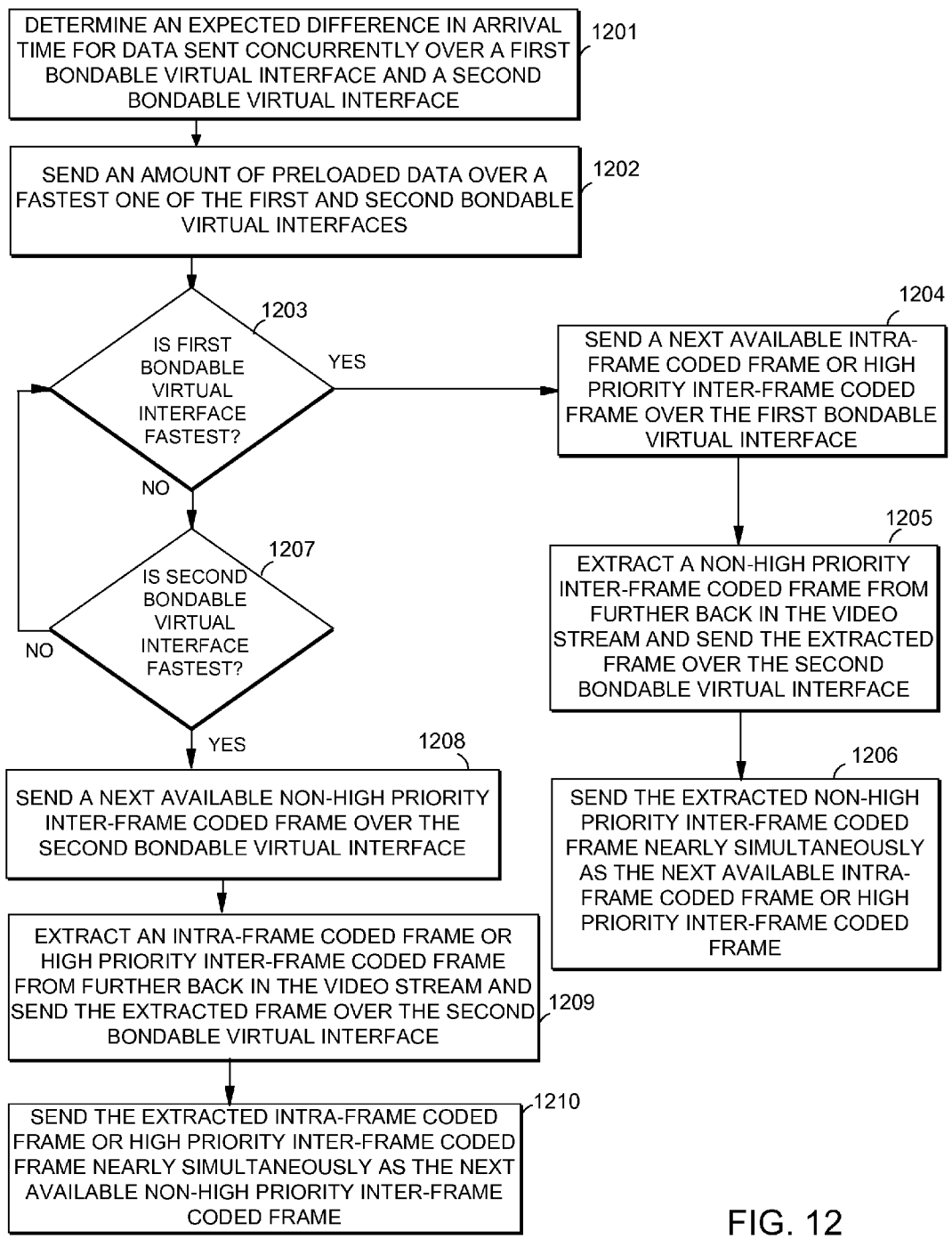
FIG. 12 is a flowchart for providing a detailed explanation of another example embodiment.

FIG. 12 is a flowchart for providing a detailed explanation of another example embodiment. In this example embodiment, the multiple communication channels having a connection-oriented protocol comprised of a first bondable virtual interface, and the multiple communication channels having a connectionless-oriented protocol comprised of a second bondable virtual interface.

As shown in FIG. 12, in step 1201, a determination is made by the sending endpoint 101 as to an expected difference in arrival time for data sent concurrently over the first bondable virtual interface and the second bondable virtual interface. In step 1202, an amount of preloaded data including intra-frame coded frames and inter-frame coded frames is sent by the sending endpoint 101 over a fastest one of the first bondable virtual interface and the second bondable virtual interface. The fastest one of the first and second virtual interfaces is determined based on the determined expected difference in arrival time.

In step 1203, a determination is made by the sending endpoint 101 as to whether the first bondable virtual interface is the fastest of the first and second bondable virtual interfaces. In a case that the first bondable virtual interface is the fastest, the process proceeds to step 1204. If the first bondable virtual interface is not the fastest, then the process proceeds to step 1207. In step 1204, a next available intra-frame coded frame or high priority inter-frame coded frame is sent over the first bondable virtual interface. In step 1205, a non-high priority inter-frame coded frame is extracted from further back in the video stream and sent over the second bondable virtual interface. In step 1206, the extracted non-high priority inter-frame coded frame is sent nearly simultaneously as the next available intra-frame coded frame or high priority inter-frame coded frame.

In step 1207, a determination is made as to whether the second bondable virtual interface is the fastest of the first and second bondable virtual interfaces. In a case that the second bondable virtual interface is the fastest, the process proceeds to step 1208. If the second bondable virtual interface is not the fastest, the process proceeds to step 1203. In step 1208, a next available non-high priority inter-frame coded frame is sent over the second bondable virtual interface. In step 1209, an intra-frame coded frame or high priority inter-frame coded frame is extracted from further back in the video stream and sent over the first bondable virtual interface. In step 1210, the extracted intra-frame coded frame or high priority inter-frame coded frame is sent nearly simultaneously as the next available non-high priority inter-frame coded frame.

Subsequently, the process of FIG. 10 as described above can be performed, which will be described in more detail below in connection with FIG. 16. Alternatively, the process of FIG. 11 as described above can be subsequently performed, which will be described in more detail below in connection with FIG. 16.

Figure 13:
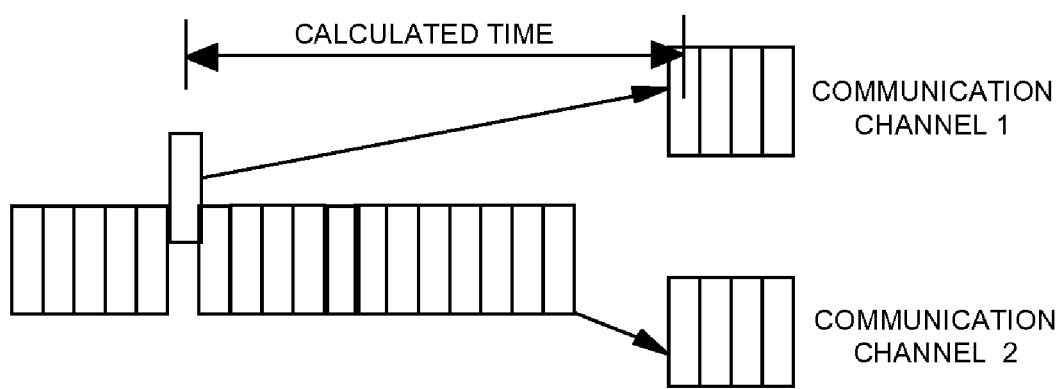
FIG. 13 is an illustration for providing an explanation of an extracted frame or data packet from further back in a series of frames or data packets.

As used herein, in the example embodiment in which the frames are split into series of data packets, "further back" refers to a data packet extracted an amount of calculated time back in the series of data packets, the calculated time being equal to the determined expected difference in arrival time. Alternatively, in the example embodiment in which the frames are not split into series of data packets, "further back" refers to a frame extracted an amount of time back in the series of frames. FIG. 13 illustrates this point. FIG. 13 is described in terms of data packets for the sake of brevity; however, the concepts of FIG. 13 also apply to frames of a video stream. As shown in FIG. 13, a data packet is extracted further back in the series of data packets according to a calculated time, the calculated time being the time it will take for the extracted data packet to reach a receiving endpoint at approximately the same time as the data packet sent from the front of the line, the calculated time having been determined by the expected difference in arrival time. In cases when data is being sent with a protocol which uses time stamps, the time stamps can be used in order to determine which data packet should be extracted from further back in the series so as to equal the calculated time. For example, if the calculated time is 5 seconds and the next data packet to be sent (i.e., first in line) has a time stamp header of 1:23:05, then the data packet to be extracted further back in the series would be a data packet with a time stamp header of 1:23:10.

In other cases for other types of data (e.g., non-media, with no additional protocol header time stamps, or media data that is intentionally not partitioned along the protocol packet boundaries, and therefore cannot use time stamp headers), then the aggregate available bandwidth, capacity, or a historical throughput would be used to estimate how much data represents the calculated time. For example, if communication channel 1 of FIG. 13 is known (e.g., through aggregate available bandwidth or historical throughput) to send 10 Mb of data from endpoint to endpoint in 10 seconds, and communication channel 2 is known to send 10 Mb of data from endpoint to endpoint in 1 second, then, assuming each data packet is 1 Mb and the calculated time is 10 seconds, the data packet to be extracted farther back in the series would be a data packet which is 10 data packets back in the series from the front.

Figure 14:
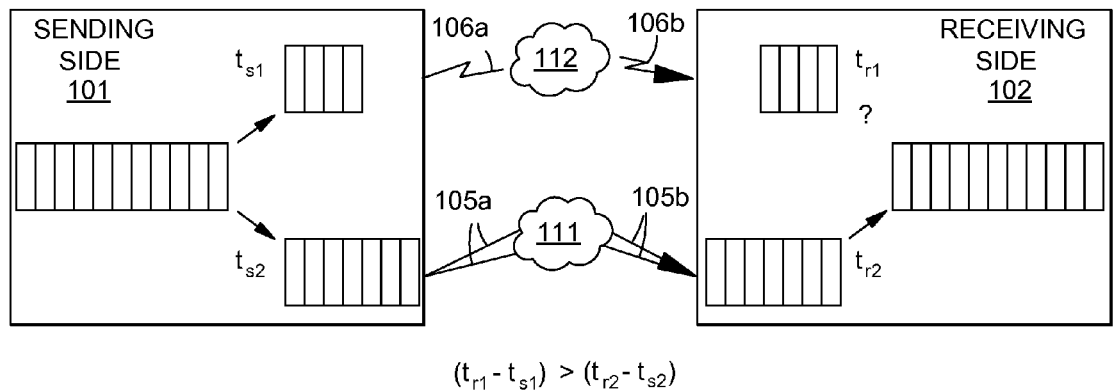
FIGS. 14 and 15 are illustrations for providing a further explanation of the example embodiments shown in FIGS. 10 and 11.
Figure 15:
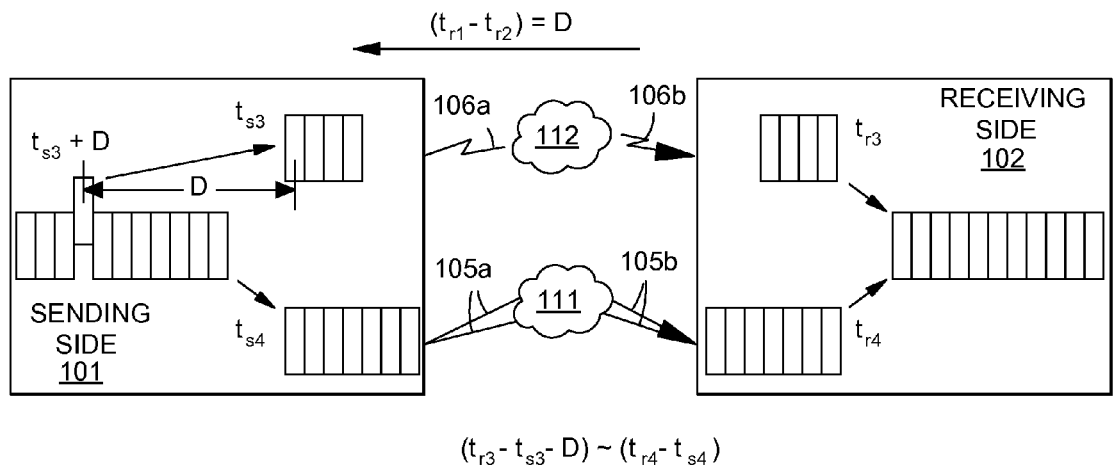

FIGS. 14 and 15 are illustrations for providing a further explanation of the example embodiments shown in FIGS. 10 to 12. Similar to FIG. 13, FIGS. 14 and 15 are described in terms of data packets for the sake of brevity; however, the concepts of FIGS. 14 and 15 also apply to frames of a video stream. As shown in FIG. 14, two packets are sent from the sending side simultaneously using diverse communication channels. In particular, a first packet is sent via a wireless interface. The first packet is sent from the sending side at time ts1, at which point the sending side puts the first packet into the transmit buffer of the associated wireless network interface. Meanwhile, a second packet is sent via a wired interface. The second packet is sent at time ts2 (which is approximately equal to ts1), at which point the second packet is placed into the transmit buffer of the associated wired network interface on the sending side. The wireless interface is an order of magnitude slower than the wired interface. Thus, it is expected that the time tr1 when the packet is ready to be read from the receive buffer of the wireless interface on the receiving side is going to be later than the time tr2 when the second packet sent is ready to be read from the receive buffer of the wired interface on the receiving side. In view of the foregoing, it is observed that (tr1−ts1)>(tr2−ts2).

The magnitude of the difference expressed above represents the magnitude of time during which the receiving end must wait when reconstructing the single stream of data from the two connections. During this time, the faster stream will stall, while the system waits for the slower stream to produce the expected data. One way to avoid such as a stall is to accept further data from the faster stream while continuing to wait for the slow data to arrive. While this solution allows the faster interface to continue transferring data, it does not allow the reconstructed stream to continue to be consumed upon the receiving side, since the late packet is still not available. Eventually, upon the arrival of the slower data, the original data stream can be properly reconstructed and consumed.

Any such solution requires significant resources on the client, which has to temporarily store an unknown quantity of data, and then reassemble the resulting stream. Unfortunately, the client machine, as above, is already resource constrained and is hardly capable of doing that. FIG. 15 shows the mechanism as described in connection with FIGS. 10 to 12 for minimizing the resources used to reassemble a single stream of data from more than one communication channel.

As shown in FIG. 15, a plurality of communication channels is given, over which the content from a single stream of data has been spread, a method of measuring the relative delay between sending and receiving of the data packets is implemented. This may be as simple as adding a custom header with such information as a sequence number and/or timestamp. Or, in the case of a typical multimedia stream, commonly included protocol headers such as RTP can be used.

Absolute time delay is not essential, if all the substreams are sourced by one server. For this example embodiment, the relative delay in reception times (tr1−tr2) will be considered. At the start of sending, this relative delay will be assumed to be 0, or else assumed to be the same as observed in a previous sending of data, or looked up in a table which stores various constant values to be used as an initial expected delay between two dissimilar interfaces of known types. For the purposes of discussion, the expected relative delay will be assumed to be 0.

Thus, upon receiving the (second) packet transmitted over the faster communication channel, the receiving side starts a timer or notes the time tr2. When the (first) packet, from the slower communication channel is received, the timer will be stopped, or else time tr1 is observed, and the relative difference (tr1−tr2) is calculated. This difference, D, is then communicated back to the sending side. This communication may either happen via a custom feedback message of some type, or be incorporated into a modified receiver report in a message which largely complies with receiver reports (such as an RTCP receiver report).

Upon reception of such a message, the sending side will modify the way in which it sends data from the stream to be sent. Instead of sending the next available packet over all of the communication channels, the sending side will send the next available packet only over the fastest communication channel (in this case, the wired interface used for the 2nd packet, above). The next packet to be sent over the remaining of the multiple communication channels used will be drawn from farther back in the stream to be sent (thus, 'future' data). It is noted that the sending side is not limited to the scheduling of data packets from the fastest communication channel to the slowest communication channel, and always drawing data from farther back in the data stream; rather, other scheduling of data packets may be implemented by the sending side. For example, the sending side may send more data over some of the communication channels more often than other communication channels. In another example, the order of communication channels used to send the data packets may be a different (but noted) order than fastest to slowest communication channel.

The sending side will identify a packet which represents a point of time approximately equal to 'D' units of time in the future. Such a future packet may be identified either from any existing protocol header timestamps (such as RTP or SCTP timestamps), or else may be identified using the known average bit rate of the media being sent (in the case of a multimedia datastream). In the case of a non-media stream, the future packet may be estimated using the known aggregate available bandwidth or data capacity of the communication channels being used for simultaneous streaming. Regardless of how it is identified, this 'future' packet will be extracted from the datastream (whether it is stored as a linked list of packets or some form of IO stream which must be continuously read into a temporary holding buffer on the sending side), and sent. It will not be sent again when that point of time reaches the 'head' of the sending stream.

Having sent the packet 'early' by D units of time, it is expected that the packet will arrive at about the expected time at the receiving side, allowing the reconstruction of the original stream to happen with minimal delays. If the packet is delayed, further, the receiving side can communicate additional delay D2 to the sending side at the next opportunity for feedback. If the packet arrives early, the receiving side, having identified this medium as one which is delayed with respect to others, can simply communicate a reduction in delay (−D2) to the sending side, rather than adding delay to the faster channel. By maintaining a history of observed delays, the receiving side can track which communication channels require additional delay to continuously minimize variation in expected delivery of packets, essentially in order, at the receiving side. At the receiving side, simple statistics can be used to provide a dampening in communicated observed delays and to avoid oscillating between communicating a delay, and communicating a reduction in delay at the next opportunity, followed by a similar delay, and so on.

Figure 16:
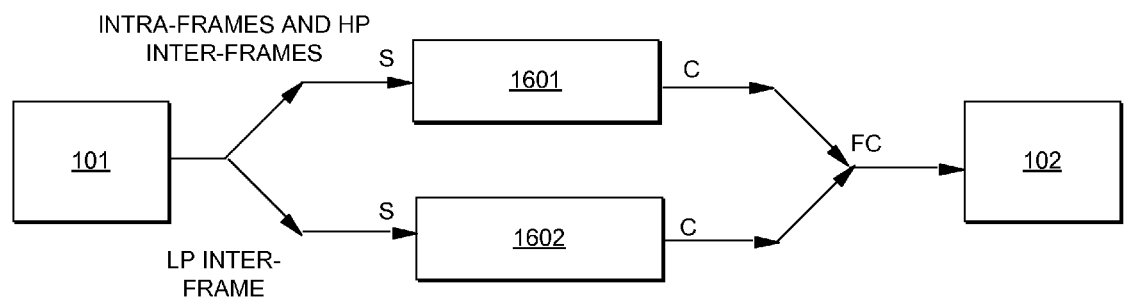
FIG. 16 is an illustration for providing a high level explanation of the processes described in FIGS. 8 to 12.

FIG. 16 is an illustration for providing a high level explanation of the processes described in FIGS. 8 to 12. As shown in FIG. 16, the video stream is split into intra-frame coded frames and high priority inter-frame coded frames, and low priority inter-frame coded frames. The splitting of the video stream may be implemented using the process described above in connection with FIG. 12. In step 1601 of FIG. 16, the intra-frame coded frames and the high priority inter-frame coded frames are then sent over the communication channels in accordance with FIG. 10A described above. Alternatively, in step 1601, the intra-frame coded frames and the high priority inter-frame coded frames are sent over the communication channels in accordance with FIG. 11A described above. In step 1602, the low priority inter-frame coded frames are sent over the communication channels in accordance with FIG. 10B described above. Alternatively, in step 1602, the non-high priority inter-frame coded frames are sent over the communication channels in accordance with FIG. 11B. Lastly, the combined intra-frame coded frames and high priority inter-frame coded frames from step 1601, and the combined non-high priority inter-frame coded frames from step 1602 are finally combined at the receiving endpoint.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for streaming a video from a sending endpoint to a receiving endpoint, wherein both of the sending endpoint and the receiving endpoint have multiple communication channels connecting the sending endpoint and the receiving endpoint to one or more networks, respectively, wherein the streaming video includes a plurality of intra-frame coded frames and a plurality of inter-frame coded frames, wherein in the method the sending endpoint performs:

sending different ones of the plurality of intra-frame coded frames over more than one of the multiple communication channels having a connection-oriented protocol;

determining whether an inter-frame coded frame is or is not a high priority frame, wherein an inter-frame coded frame is a high priority frame if a number of references to the inter-frame coded frame by other inter-frame coded frames is more than a threshold number;

sending different ones of the plurality of inter-frame coded frames which are determined to be high priority frames over more than one of the multiple communication channels having a connection-oriented protocol; and sending different ones of the plurality of inter-frame coded frames which are determined not to be high priority frames over more than one of the multiple communication channels having a connectionless-oriented protocol.

2. A method according to claim 1, wherein the sent intra-frame coded frames and inter-frame coded frames are received at the receiving endpoint, and recombined to reconstruct the video stream.

3. A method according to claim 1, wherein before the video stream is split into the plurality of intra-frame coded frames and the plurality of inter-frame coded frames, an amount of preloaded data including both intra-frame coded frames and inter-frame coded frames is sent over one of the multiple communication channels having a connection-oriented protocol.

4. A method according to claim 3, wherein the amount of preloaded data is determined based upon a size of a buffer included in the receiving endpoint and a playback rate of the video stream at the receiving endpoint.

5. A method according to claim 1, wherein a determination is made as to an expected difference in arrival time between intra-frame coded frames and/or high priority inter-frame coded frames sent concurrently over different ones of the multiple communication channels having a connection-oriented protocol, and a determination is made as to an expected difference in arrival time between non-high priority inter-frame coded frames sent concurrently over different ones of the multiple communication channels having a connectionless-oriented protocol, wherein in the step of sending the intra-frame coded frames or high priority inter-frame coded frames, a next available intra-frame coded frame or a next available high priority inter-frame coded frame is sent over a fastest one of the multiple communication channels having a connection-oriented protocol, the fastest one of the multiple communication channels being determined based on the determined expected difference in arrival time, wherein an intra-frame coded frame or a high priority inter-frame coded frame is extracted from further back in the plurality of intra-frame coded frames or plurality of inter-frame coded frames in accordance with the determined expected difference in arrival time, and the extracted intra-frame coded frame or high priority inter-frame coded frame is sent on a corresponding slower one of the multiple communication channels, wherein the next available intra-frame coded frame or high priority inter-frame coded frame is sent from the sending endpoint nearly simultaneously as the extracted intra-frame coded frame or high priority inter-frame coded frame is sent from the sending endpoint, wherein in the step of sending the non-high priority inter-frame coded frames, a next non-high priority inter-frame coded frame of the plurality of inter-frame coded frames is sent over a fastest one of the multiple communication channels having a connectionless-oriented protocol, the fastest one of the multiple communication channels being determined based on the determined expected difference in arrival time, wherein a non-high priority inter-frame coded frame is extracted from further back in the plurality of inter-frame coded frames in accordance with the determined expected difference in arrival time, and the extracted non-high priority inter-frame coded frame is sent on a corresponding slower one of the multiple communication channels, and wherein the next available non-high priority inter-frame coded frame is sent from the sending endpoint nearly simultaneously as the extracted non-high priority inter-frame coded frame is sent from the sending endpoint.

6. A method according to claim 5, wherein each determination is made using historical statistical data regarding performances of each of the communication channels.

7. A method according to claim 1, wherein each of the intra-frame coded frames and the high priority inter-frame coded frames are split into a series of data packets, each of the non-high priority inter-frame coded frames are split into a series of data packets, and when sending the frames over the multiple communication channels, different ones of the series of data packets are sent over the multiple communication channels.

8. A method according to claim 7, wherein a determination is made as to an expected difference in arrival time between data packets of the intra-frame coded frames and/or high priority inter-frame coded frames sent concurrently over different ones of the multiple communication channels having a connection-oriented protocol, and a determination is made as to an expected difference in arrival time between data packets of the non-high priority inter-frame coded frames sent concurrently over different ones of the multiple communication channels having a connectionless-oriented protocol, wherein in the step of sending data packets of the intra-frame coded frames or high priority inter-frame coded frames, a next available data packet of the series of data packets of the intra-frame coded frames or high priority inter-frame coded frames is sent over a fastest one of the multiple communication channels having a connection-oriented protocol, the fastest one of the multiple communication channels being determined based on the determined expected difference in arrival time, wherein a data packet of the series of data packets of the intra-frame coded frames or the high priority inter-frame coded frames is extracted from further back in the series of data packets in accordance with the determined expected difference in arrival time, and the extracted data packet is sent on a corresponding slower one of the multiple communication channels, wherein the next available data packet of the series of data packets of the intra-frame coded frames or the high priority inter-frame coded frames is sent from the sending endpoint nearly simultaneously as the extracted data packet is sent from the sending endpoint, wherein in the step of sending data packets of the non-high priority inter-frame coded frames, a next available data packet of the series of data packets of the non-high priority inter-frame coded frames is sent over a fastest one of the multiple communication channels having a connectionless-oriented protocol, the fastest one of the multiple communication channels being determined based on the determined expected difference in arrival time, wherein a data packet of the series of data packets of the non-high priority inter-frame coded frames is extracted from further back in the series of data packets in accordance with the determined expected difference in arrival time, and the extracted data packet is sent on a corresponding slower one of the multiple communication channels, and wherein the next available data packet is sent from the sending endpoint nearly simultaneously as the extracted data packet is sent from the sending endpoint.

9. A method according to claim 1, wherein the multiple communication channels having a connection-oriented protocol comprised of a first bondable virtual interface, and the multiple communication channels having a connectionless-oriented protocol comprised of a second bondable virtual interface, wherein a determination is made as to an expected difference in arrival time for data sent concurrently over the first bondable virtual interface and the second bondable virtual interface, wherein an amount of preloaded data including intra-frame coded frames and inter-frame coded frames is sent over a fastest one of the first bondable virtual interface and the second bondable virtual interface, the fastest one being determined based on the determined expected difference in arrival time, wherein in a case that the first bondable virtual interface is the fastest, a next available intra-frame coded frame or high priority inter-frame coded frame is sent over the first bondable virtual interface, and a non-high priority inter-frame coded frame is extracted from further back in the video stream and sent over the second bondable virtual interface, the extracted non-high priority inter-frame coded frame being sent nearly simultaneously as the next available intra-frame coded frame or high priority inter-frame coded frame, and wherein in a case that the second bondable virtual interface is the fastest, a next available non-high priority inter-frame coded frame is sent over the second bondable virtual interface, and an intra-frame coded frame or high priority inter-frame coded frame is extracted from further back in the video stream and sent over the first bondable virtual interface, the extracted intra-frame coded frame or high priority inter-frame coded frame being sent nearly simultaneously as the next available non-high priority inter-frame coded frame.

10. A method according to claim 1, wherein the threshold number is set by a user.

11. A method according to claim 1, wherein the threshold number is determined based upon a number of frames that are dropped before a quality of service (QoS) is reduced such that the reduction in QoS is noticeable to a viewer.

12. A method according to claim 1, wherein in a case that an inter-frame coded frame is not received by the receiving endpoint, feedback is sent from the receiving endpoint to the sending endpoint indicating the inter-frame coded frame that was not received, and the inter-frame coded frame is re-sent over one of the multiple communication channels having a connection-oriented protocol.

13. The method according to claim 1, wherein the multiple communication channels are carried over multiple physical interfaces connecting the sending endpoint and the receiving endpoint to one or more networks, respectively.

14. The method according to claim 1, wherein the multiple communication channels are carried over a single physical interface.

15. A method for streaming a video from a sending endpoint to a receiving endpoint, wherein both of the sending endpoint and the receiving endpoint have multiple communication channels connecting the sending endpoint and the receiving endpoint to one or more networks, respectively, wherein the streaming video includes a plurality of intra-frame coded frames and a plurality of inter-frame coded frames, wherein in the method the receiving endpoint performs:

receiving intra-frame coded frames and inter-frame coded frames sent from the sending endpoint; and recombining the intra-frame coded frames and inter-frame coded frames to reconstruct the video stream, wherein different ones of the plurality of intra-frame coded frames are sent by the sending endpoint and received by the receiving endpoint over more than one of the multiple communication channels having a connection-oriented protocol, wherein a determination is made as to whether an inter-frame coded frame is or is not a high priority frame, wherein an inter-frame coded frame is a high priority frame if a number of references to the inter-frame coded frame by other inter-frame coded frames is more than a threshold number, wherein different ones of the plurality of inter-frame coded frames which are determined to be high priority frames are sent by the sending endpoint and received by the receiving endpoint over more than one of the multiple communication channels having a connection-oriented protocol, and wherein different ones of the plurality of inter-frame coded frames which are determined not to be high priority frames are sent by the sending endpoint and received by the receiving endpoint over more than one of the multiple communication channels having a connectionless-oriented protocol.

16. A method according to claim 15, wherein before the split video stream is received by the receiving endpoint, an amount of preloaded data including both intra-frame coded frames and inter-frame coded frames is received over one of the multiple communication channels having a connection-oriented protocol.

17. A method according to claim 16, wherein the amount of preloaded data is determined based upon a size of a buffer included in the receiving endpoint and a playback rate of the video stream at the receiving endpoint.

18. A method according to claim 15, wherein each of the intra-frame coded frames and the high priority inter-frame coded frames are split into a series of data packets by the sending endpoint, each of the non-high priority inter-frame coded frames are split into a series of data packets by the sending endpoint, and when receiving the frames over the multiple communication channels, different ones of the series of data packets are received by the receiving endpoint over the multiple communication channels, and are recombined by the receiving endpoint into the intra-frame coded frames and the inter-frame coded frames.

19. A method according to claim 15, wherein the threshold number is set by a user.

20. A method according to claim 15, wherein the threshold number is determined based upon a number of frames that are dropped before a quality of service (QoS) is reduced such that the reduction in QoS is noticeable to a viewer.

21. A method according to claim 15, wherein in a case that an inter-frame coded frame is not received by the receiving endpoint, the receiving endpoint sends feedback to the sending endpoint indicating the inter-frame coded frame that was not received, and the inter-frame coded frame is re-sent over one of the multiple communication channels having a connection-oriented protocol.

22. The method according to claim 15, wherein the multiple communication channels are carried over multiple physical interfaces connecting the sending endpoint and the receiving endpoint to one or more networks, respectively.

23. The method according to claim 15, wherein the multiple communication channels are carried over a single physical interface.

24. A sending endpoint comprising:
an interface to multiple communication channels connecting the sending endpoint and a receiving endpoint to one or more networks;
a computer-readable memory constructed to store computer-executable process steps; and
a processor constructed to execute the computer-executable steps stored in the memory,
wherein the process steps stored in the memory cause the processor to stream a video from the sending endpoint to the receiving endpoint, wherein the streaming video includes a plurality of intra-frame coded frames and a plurality of inter-frame coded frames, and wherein the process steps stored in the memory include computer-executable process steps to:
send different ones of the plurality of intra-frame coded frames over more than one of the multiple communication channels having a connection-oriented protocol;
determine whether an inter-frame coded frame is or is not a high priority frame, wherein an inter-frame coded frame is a high priority frame if a number of references to the inter-frame coded frame by other inter-frame coded frames is more than a threshold number;
send different ones of the plurality of inter-frame coded frames which are determined to be high priority frames over more than one of the multiple communication channels having a connection-oriented protocol; and
send different ones of the plurality of inter-frame coded frames which are determined not to be high priority frames over more than one of the multiple communication channels having a connectionless-oriented protocol.

25. A receiving endpoint comprising:
an interface to multiple communication channels connecting a sending endpoint and the receiving endpoint to one or more networks;
a computer-readable memory constructed to store computer-executable process steps; and
a processor constructed to execute the computer-executable steps stored in the memory,
wherein the process steps stored in the memory cause the processor to stream a video from the sending endpoint to the receiving endpoint, wherein the streaming video includes a plurality of intra-frame coded frames and a plurality of inter-frame coded frames, and wherein the process steps stored in the memory include computer-executable process steps to:
receive intra-frame coded frames and inter-frame coded frames sent from the sending endpoint; and
recombine the intra-frame coded frames and inter-frame coded frames to reconstruct the video stream,
wherein different ones of the plurality of intra-frame coded frames are sent by the sending endpoint and received by the receiving endpoint over more than one of the multiple communication channels having a connection-oriented protocol,
wherein a determination is made as to whether an inter-frame coded frame is or is not a high priority frame, wherein an inter-frame coded frame is a high priority frame if a number of references to the inter-frame coded frame by other inter-frame coded frames is more than a threshold number,
wherein different ones of the plurality of inter-frame coded frames which are determined to be high priority frames are sent by the sending endpoint and received by the receiving endpoint over more than one of the multiple communication channels having a connection-oriented protocol, and
wherein different ones of the plurality of inter-frame coded frames which are determined not to be high priority frames are sent by the sending endpoint and received by the receiving endpoint over more than one of the multiple communication channels having a connectionless-oriented protocol.

26. A computer-readable memory medium on which is stored computer-executable process steps for causing a processor to stream a video from a sending endpoint to a receiving endpoint, wherein both of the sending endpoint and the receiving endpoint have multiple communication channels connecting the sending endpoint and the receiving endpoint to one or more networks, respectively, wherein the streaming video includes a plurality of intra-frame coded frames and a plurality of inter-frame coded frames, said processing steps comprising:
sending different ones of the plurality of intra-frame coded frames over more than one of the multiple communication channels having a connection-oriented protocol;

determining whether an inter-frame coded frame is or is not a high priority frame, wherein an inter-frame coded frame is a high priority frame if a number of references to the inter-frame coded frame by other inter-frame coded frames is more than a threshold number;

sending different ones of the plurality of inter-frame coded frames which are determined to be high priority frames over more than one of the multiple communication channels having a connection-oriented protocol; and sending different ones of the plurality of inter-frame coded frames which are determined not to be high priority frames over more than one of the multiple communication channels having a connectionless-oriented protocol.

27. A computer-readable memory medium on which is stored computer-executable process steps for causing a processor to streaming a video from a sending endpoint to a receiving endpoint, wherein both of the sending endpoint and the receiving endpoint have multiple communication channels connecting the sending endpoint and the receiving endpoint to one or more networks, respectively, wherein the streaming video includes a plurality of intra-frame coded frames and a plurality of inter-frame coded frames, said processing steps comprising:

receiving intra-frame coded frames and inter-frame coded frames sent from the sending endpoint; and recombining the intra-frame coded frames and inter-frame coded frames to reconstruct the video stream, wherein different ones of the plurality of intra-frame coded frames are sent by the sending endpoint and received by the receiving endpoint over more than one of the multiple communication channels having a connection-oriented protocol, wherein a determination is made as to whether an inter-frame coded frame is or is not a high priority frame, wherein an inter-frame coded frame is a high priority frame if a number of references to the inter-frame coded frame by other inter-frame coded frames is more than a threshold number, wherein different ones of the plurality of inter-frame coded frames which are determined to be high priority frames are sent by the sending endpoint and received by the receiving endpoint over more than one of the multiple communication channels having a connection-oriented protocol, and wherein different ones of the plurality of inter-frame coded frames which are determined not to be high priority frames are sent by the sending endpoint and received by the receiving endpoint over more than one of the multiple communication channels having a connectionless-oriented protocol.

* * * * *